(12) United States Patent
McClelland

(10) Patent No.: US 8,388,253 B2
(45) Date of Patent: Mar. 5, 2013

(54) LINKAGE COUPLING APPARATUS

(76) Inventor: Kenneth Rae McClelland, Hanford, CA (US)

( * ) Notice: Subject to any disclaimer, the term of this patent is extended or adjusted under 35 U.S.C. 154(b) by 68 days.

(21) Appl. No.: 12/916,523

(22) Filed: Oct. 30, 2010

(65) Prior Publication Data

US 2012/0107039 A1    May 3, 2012

(51) Int. Cl.
*F16B 7/18* (2006.01)

(52) U.S. Cl. ............ 403/61; 403/118; 403/76; 74/89.37

(58) Field of Classification Search .................... 403/43, 403/46, 48, 61, 71, 74, 77, 188, 122, 343, 403/233, 200, 118, 90, DIG. 7; 74/89.23, 74/89.37

See application file for complete search history.

(56) References Cited

U.S. PATENT DOCUMENTS

| | | | | |
|---|---|---|---|---|
| 1,848,850 | A | | 3/1932 | Sturgis |
| 2,008,240 | A | | 7/1935 | Byrne |
| 2,250,417 | A | * | 7/1941 | Ettinger .................. 606/59 |
| 4,124,317 | A | | 11/1978 | Dauth |
| 4,341,344 | A | | 7/1982 | Russell |
| 4,416,561 | A | | 11/1983 | Fischer |
| 4,497,310 | A | | 2/1985 | Funke |
| 5,002,542 | A | * | 3/1991 | Frigg ..................... 606/264 |
| 5,196,013 | A | * | 3/1993 | Harms et al. ............. 606/252 |
| 1,905,734 | A | | 4/1993 | Morrow |
| 5,219,349 | A | | 6/1993 | Krag et al. |
| 5,254,118 | A | * | 10/1993 | Mirkovic ................. 606/264 |
| 5,873,200 | A | * | 2/1999 | Henderson ................ 49/343 |
| 6,142,426 | A | * | 11/2000 | Zaro et al. ............... 246/125 |

| | | | | |
|---|---|---|---|---|
| 6,343,783 | B1 | | 2/2002 | Ke |
| 7,011,469 | B2 | | 3/2006 | Sanderson et al. |
| 7,325,777 | B2 | | 2/2008 | Thiessen |

FOREIGN PATENT DOCUMENTS

| | | |
|---|---|---|
| EP | 2085351 | 5/1935 |
| GB | 877467 | 9/1961 |
| GB | 2167545 | 5/1986 |
| GB | 428640 | 5/2009 |

OTHER PUBLICATIONS

Midwest Control Products Corp.; AQD: Ball Joint, Quick Disconnect, Aluminum; website; Oct. 27, 2010; www.midwestcontrol.com; 1 page.
Power Flame Incorporated; Power Flame Type JA HTD; article; 2 pages.
Power Flame Incorporated; Power Flame Process/HVAC Burner; article; 2 pages.

(Continued)

*Primary Examiner* — Joshua Kennedy
(74) *Attorney, Agent, or Firm* — Marcus N. DiBuduo

(57) ABSTRACT

An apparatus for adjustably coupling a threaded linkage rod to an arm of a fuel valve, air valve, air damper, damper blade assembly, or actuator that can include a sleeve, a collar, and a lock restraining axial movement of the collar with respect to the sleeve. The sleeve may include an inside threaded wall defining a sleeve bore axially receiving the linkage rod. The collar may include (i) a collar body having a collar bore axially receiving the sleeve and (ii) an about radial extension for engagement with the arm of the fuel valve, air damper, or actuator. Rotation of the sleeve causes axial movement of the sleeve, and thus the collar locked thereto, along the linkage rod. Fine position adjustments can be made to the position of the radial extension, and thus the arm of the fuel valve, air damper, or actuator engaged thereto, with respect to the linkage rod.

44 Claims, 19 Drawing Sheets

OTHER PUBLICATIONS

Webster; Burner Product Guide—Leading the Way in Efficiency, Reliability, & Safety; article; 4 pages.

Hurst Boiler & Welding Company, Inc.; Tubo Hervidor De Tres Pasos—Caldera De Agua Caliente; revised Nov. 2005; article; 4 pages.

UNILUX Advanced Manufacturing; The UNILUX "VZ" Boiler; article; 4 pages.

John Zink Company LLC; Models R&S Burner Instruction Manual; instruction manual; 60 pages.

Honeywell International Incorporated; Environmental & Combustion Controls—103598; website; customer.honeywell.com; 1 page.

Honeywell Inc.; Honeywell Linkages; article; 4 pages.

NSK America; Ball Screws Product Reference Guide; 8 pages.

Motion System; Additional Ball Drive Actuators and Ball Screws; website; http://www.motionsystem.com/addball.htm; 2 pages.

* cited by examiner

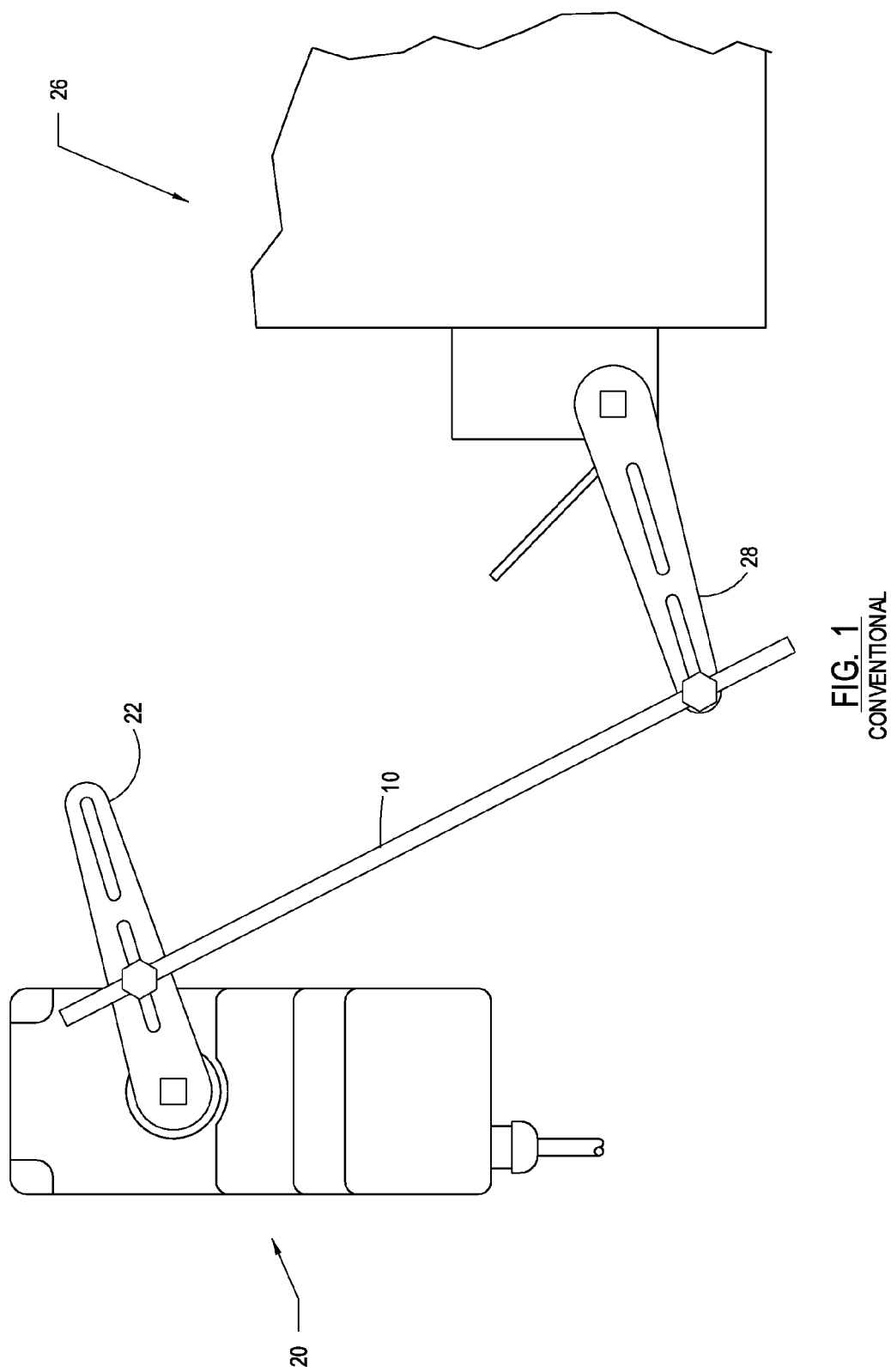
FIG. 1
CONVENTIONAL

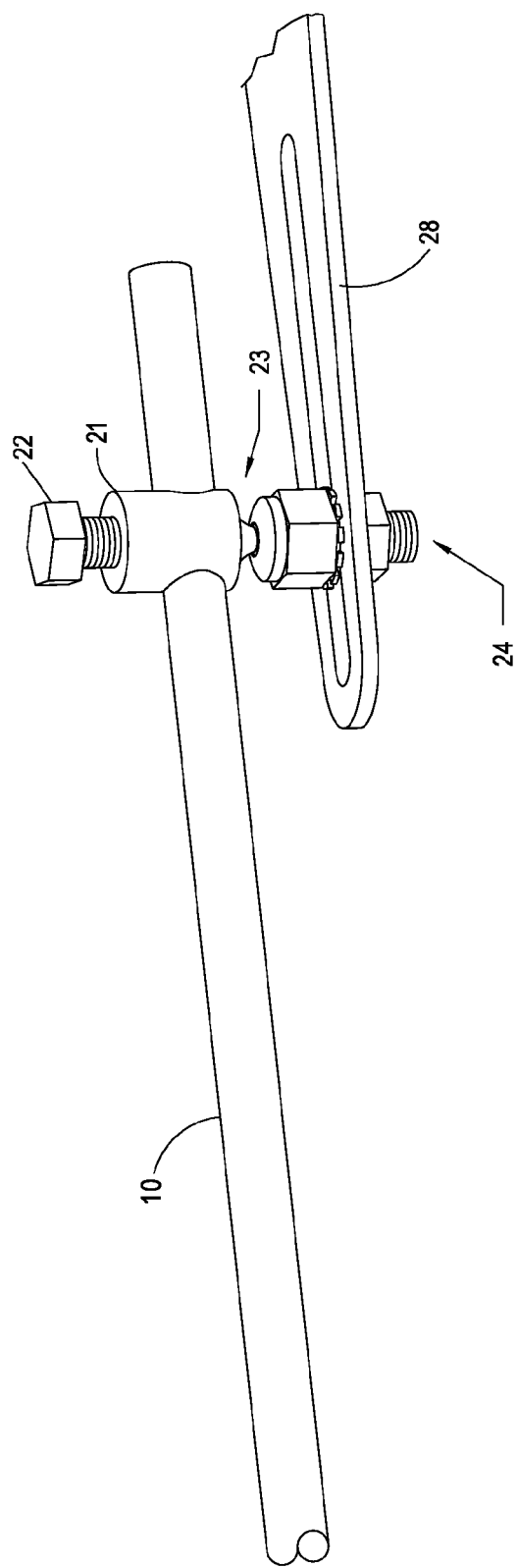
FIG. 2
CONVENTIONAL

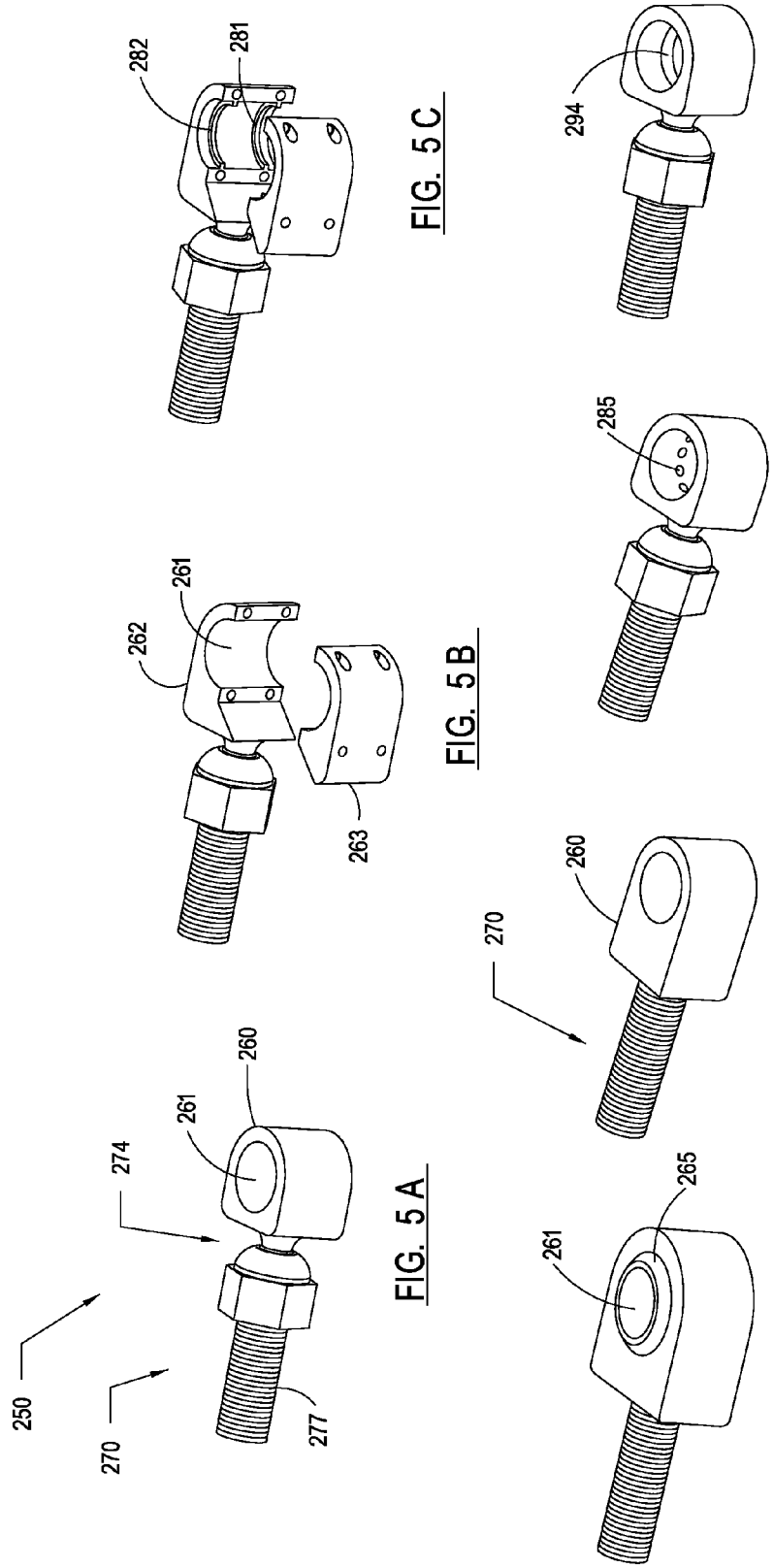

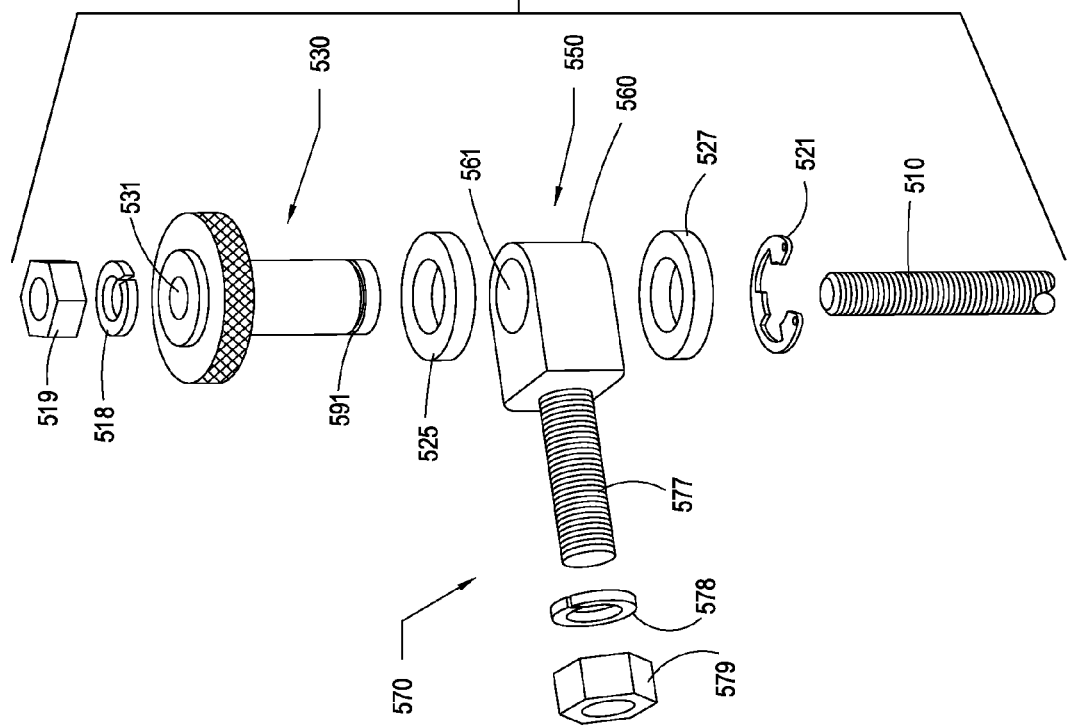
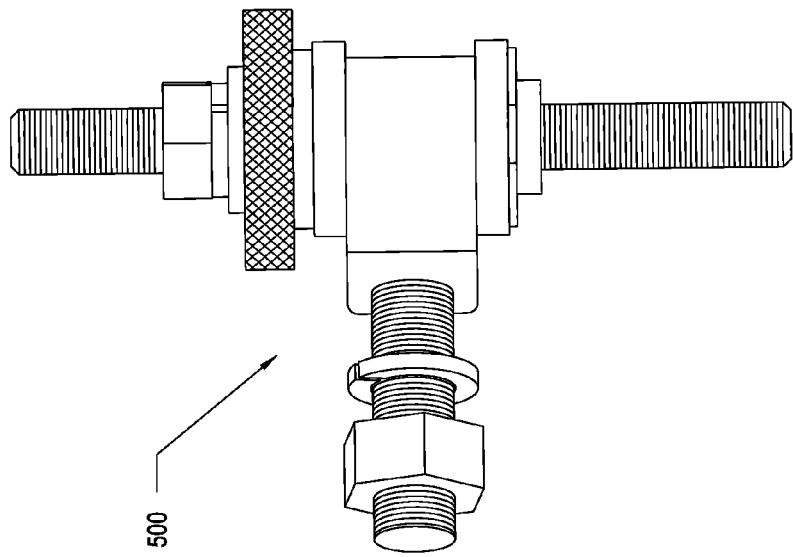

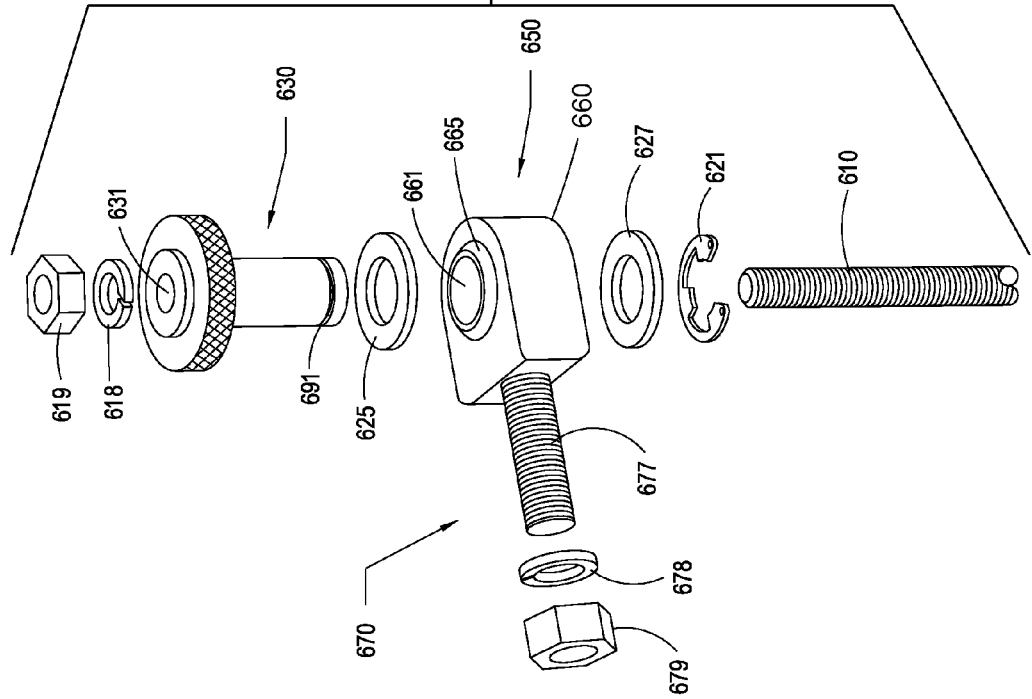
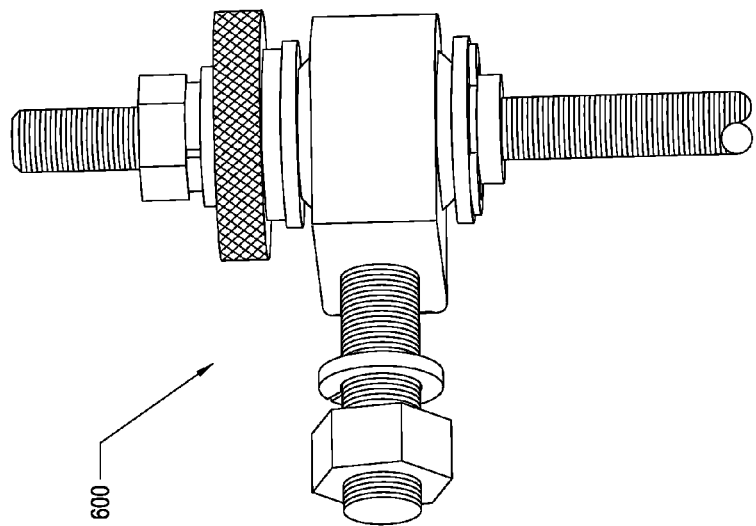

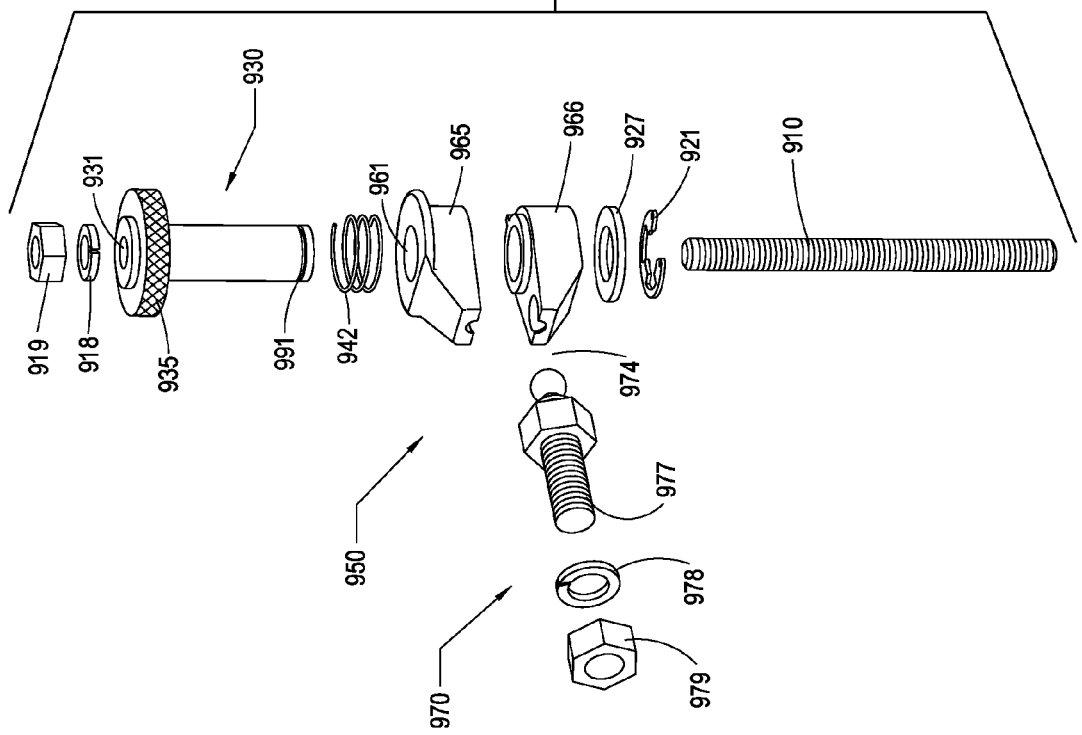
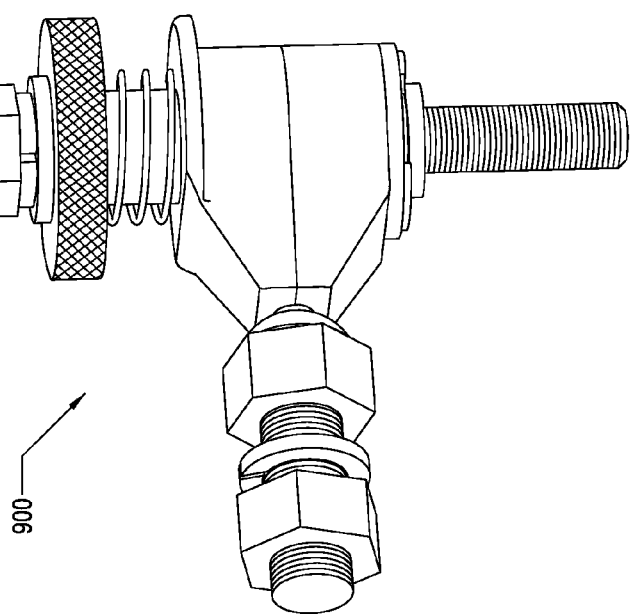
FIG. 12B
FIG. 12A

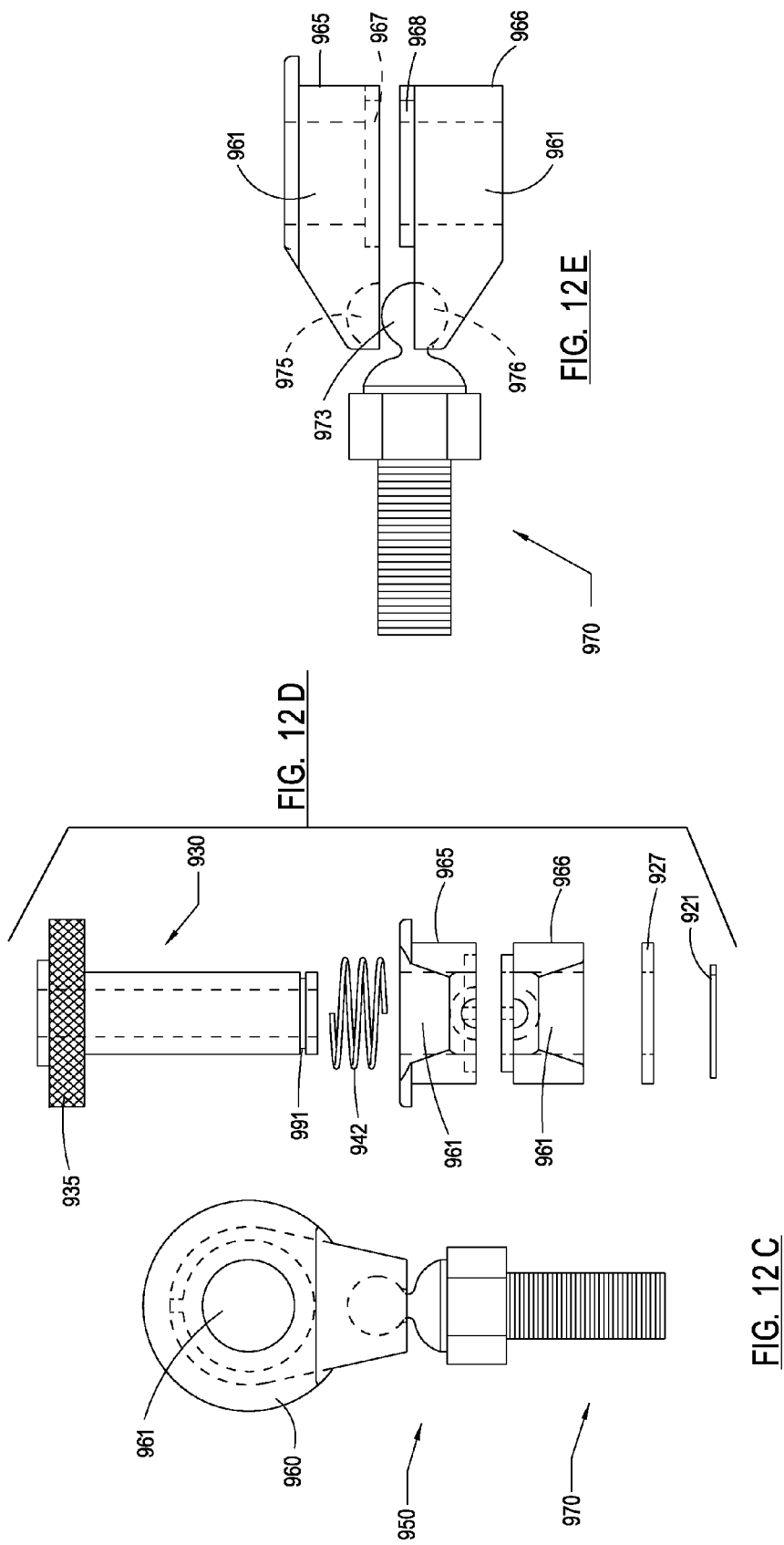

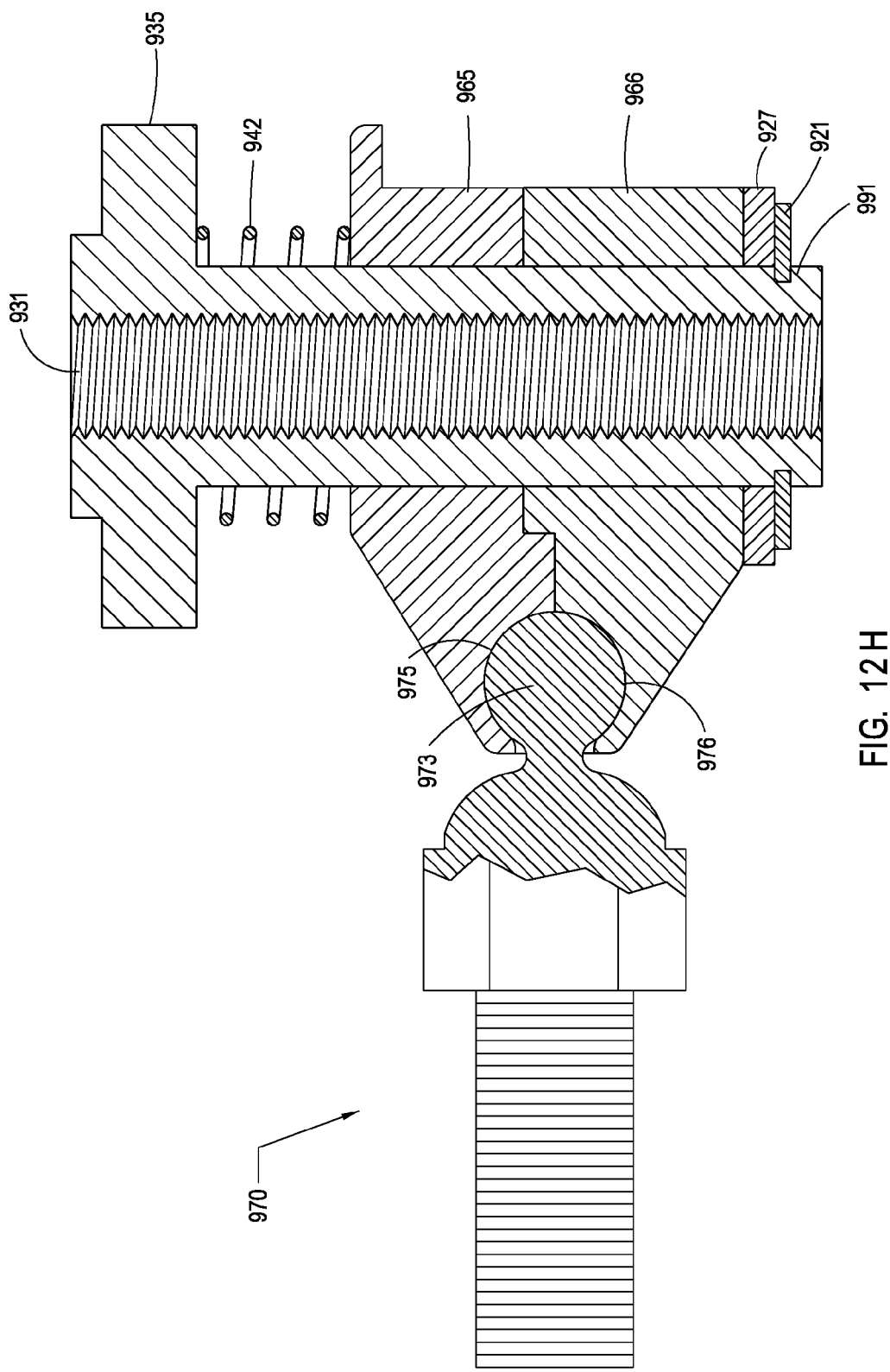

LINKAGE COUPLING APPARATUS

BACKGROUND OF THE INVENTION

1. Field of the Invention

The present invention generally relates to the field of assemblies for linking, or coupling, one or more devices. More specifically, embodiments of the present invention pertain to apparatuses for coupling fuel valves, air valves, damper assemblies, actuator motors, and/or the like in burner jackshaft assemblies.

2. Background and Description of Related Art

Conventional burner assemblies include linkage rods coupling a fuel valve and an air intake or inlet damper to maintain a nearly constant fuel/air ratio. Referring to the illustration of FIG. 1, a conventional burner assembly can include an air intake 26 and an actuator motor 20. In some implementations, actuator motor 20 can cooperate directly with the fuel valve. In other implementations, actuator motor 20 can be linked directly to the fuel valve much in the same way that actuator motor 20 is linked to air intake 26. In yet other implementations, a combination of linkages may be connected to a damper of an air intake, a fuel valve, and/or an actuator motor to accomplish and maintain proper air/fuel ratios.

Slotted bar 22 can be attached to a drive shaft of actuator motor 20 (or, in some implementations, a fuel valve). Similarly, slotted bar 28 can be attached to an air inlet damper of air intake 26. In some implementations, linkage rod 10 may couple slotted bar 22 and slotted bar 28. It is to be appreciated that as the drive shaft of actuator motor 20 moves, force may be transmitted through slotted bar 22, through linkage rod 10, to slotted bar 28. Thus, the opening of the gas valve can be proportional to the opening of the air inlet damper. Thus, actuator motor 20 may increase or decrease the amount of fuel to the burner assembly to provide more or less combustion while maintaining a relatively consistent air/fuel ratio.

It is to be appreciated that the air/fuel ratio of the burner is determined by the positioning of slotted bar 22 and slotted bar 28 on linkage rod 10, including among other things, the distance along linkage rod 10 between the coupling locations of slotted bar 22 and slotted bar 28 and the position of coupling location on slotted bar 22 and slotted bar 28. As such, when it is desired to change the air/fuel ratio of the burner, one or both of the coupling positions require adjustment.

Referring to the illustration of FIG. 2, some conventional applications include a solid linkage rod 10 and a coupling apparatus for securing linkage rod 10 to slotted bar 28. In some implementations, the conventional coupling apparatus can include a body 21 and a locking bolt 22. Forward rotation of locking bolt 22 within body 21 causes a distal end of locking bolt to come into frictional contact with linkage rod 10. Second bolt 24 can be provided with securing features (such as a hex nut) for removable engagement with, and positioning along, slotted bar 28. In some conventional applications, hinge joint 23 may be provided to enable movement of bolt 24 with respect to body 21.

In some applications, it is desirable to make adjustments to the air/fuel ratio while the burner is in operation. To do so, an operator must loosen bolt 22, slide body 21 along linkage rod to a desired position, and retighten bolt 22. In addition, an operator may also loosen the locking feature on bolt 24, slide bolt 24 along the slot of slotted bar 28, and retighten the locking feature on bolt 24. Once the adjustment has been made, the operator must analyze the new air/fuel ratio and make additional adjustments if necessary. Nonetheless, with conventional linkage assemblies, adjustments to the linkage while the burner is in operation is not recommended because of increased risk of explosion. It can be appreciated that after locking bolt 22 has been loosened, accidental slippage of linkage rod 10 through body 21 may occur, which may cause the air inlet damper attached to slotted bar 28 to completely or near completely close restricting air flow to the burner. Thus in many applications, it is necessary to turn off the burner before adjustments to the position of body 21 along linkage rod 10 can be made. After the adjustment is made and the burner is turned back on, a flue gas analysis can be made to determine whether additional adjustments need to be made.

It is to be appreciated that body 21 is secured in its position along linkage rod 10 by the frictional contact of locking bolt 22. In some instances, over tightening of locking bolt 22 causes permanent divots in linkage rod 10. Depending on the number of times that locking bolt 22 has been secured against linkage rod 10, and the tightening practices of the operator, the ability to make future fine-tuning adjustments may be reduced. For example, very small changes in the position of body 21 along linkage rod 10 may not be possible because bolt 22, when tightened, may slip into a divot previously formed in linkage rod 10. In addition, slippage of body 10 along linkage rod 10 may occur over time due to natural loosening of bolt 22. These and other inherent problems with conventional coupling apparatus require the linkage rod and/or the coupling apparatus to be replaced from time to time, increasing the down time of burner operations and increasing maintenance costs.

It is therefore desirable to provide coupling apparatuses which enable fine-tune adjustments to the positioning along a linkage rod and which obviate conventional wear and tear.

SUMMARY OF THE INVENTION

Embodiments of the present invention relate to improved coupling apparatuses. More specifically, improved coupling apparatuses can include a sleeve and collar for fine position adjustments along a threaded linkage rod.

In some aspects, the invention concerns an apparatus for adjustably coupling a threaded linkage rod to a device that can include a sleeve, a collar, and a lock restraining axial movement of the collar with respect to the sleeve. The sleeve may include an inside threaded wall defining a sleeve bore axially receiving the linkage rod. The collar may include (i) a collar body having a collar bore axially receiving the sleeve and (ii) an about radial extension for engagement with the device.

In some embodiments, the sleeve can have a proximal end and an elongate distal portion, where a diameter of an outside wall of the proximal end is greater than a diameter of an outside wall of the distal portion. The outside wall of the proximal end may have a machined surface or a geometric surface comprising at least three lateral faces.

In some embodiments, the collar body can include at least two collar body portions, each collar body portion having an inside wall partially defining the collar bore. The collar body portions may be coupled by a bolt, a screw, a snap-fit connection, or a clamp. In some other embodiments, the collar body may include (i) an inner ball with an axial opening therein defining the collar bore and (ii) a socket receiving the inner ball.

In some embodiments, the apparatus can also include an intermediate sleeve between the collar body and the sleeve and a ball. The intermediate sleeve may have an axial opening therein defining the collar bore and a wall having a tapered circular opening therein. The ball may be positioned between the sleeve and the circular opening in the intermediate sleeve, and have a diameter greater than a diameter of the circular opening in the intermediate sleeve. The intermediate sleeve may also include an inwardly protruding member on a distal end thereof. In some embodiments, the lock can include a recess (such as a well, a groove, or a slot) in an outside wall of the sleeve for receiving the inwardly protruding member of the intermediate sleeve.

In some other embodiments, the lock can include a recess in an outside wall of the sleeve for receiving a clip. In some other embodiments, the lock can include a recess in an outside wall of the sleeve for receiving a protrusion (such as a spring loaded ball, a spring loaded tab, or a deformable tab) on an inside wall of the collar body. In some other embodiments, the lock can include a recess in an inside wall of the collar body for receiving a protrusion on an outside wall of the sleeve. In some other embodiments, the lock can include a member (such as a rigid member, a spring loaded ball, a spring loaded tab, or a deformable tab) on a distal end of the sleeve for abutting a distal end of the collar body. In some other embodiments, the lock can include an enlarged distal end of the sleeve for abutting a distal end of the collar body.

In some embodiments, the radial extension can include at least one hinge joint. In some embodiments, the hinge joint may include a ball and a socket.

In some other aspects, the invention concerns a coupling apparatus for a threaded linkage rod that can include a sleeve, a collar having a collar body an about radial extension, and a lock restraining axial movement of the collar body with respect to the sleeve. The sleeve may have an inside threaded wall defining a bore for axially receiving the linkage rod. The sleeve may also have a proximal end and an elongate distal portion. The collar may circumscribe at least a portion of the distal portion of the sleeve. In some embodiments, a diameter of an outside wall of the proximal end of the sleeve is greater than a diameter of an outside wall of the distal portion. The outside wall of the proximal end may have a machined surface or a geometric surface comprising at least three faces. In some embodiments, the radial extension may include a ball-and-socket hinge joint.

In some implementations, the collar body can have an inside wall defining a collar bore axially receiving the distal portion of the sleeve. The lock may include a recess in an outside wall of the distal portion of the sleeve for receiving a clip.

In some other implementations, the collar body can include (i) an inner ball with an opening therein defining a collar bore axially receiving the distal portion of the sleeve and (ii) an inside wall defining a socket receiving the ball. The lock may include a recess in an outside wall of the distal portion of the sleeve for receiving a clip.

In some other implementations, the collar body can include at least two collar body portions, each collar body portion having an inside wall partially defining a collar bore axially receiving the distal portion of the sleeve. The collar body portions may be coupled by a bolt, a screw, a snap-fit connection, or a clamp. The lock may include a recess in an outside wall of the distal portion of the sleeve for receiving a protrusion on an inside wall of at least one of the collar body portions.

In some other implementations, the coupling apparatus can include an intermediate sleeve between the collar body and the sleeve. In some embodiments, the intermediate sleeve can have an axial opening defining an intermediate sleeve bore receiving the distal portion of the sleeve and a wall having at least one tapered circular opening therein for receiving a ball. The intermediate sleeve may also include an enlarged proximal end. The collar body may have an inside wall defining a socket receiving the ball. In some embodiments, the coupling apparatus can include a spring between the proximal end of the sleeve and the proximal end of the intermediate sleeve. The lock may include a recess in an outside wall of the distal portion of the sleeve for receiving an inwardly protruding distal end of the intermediate sleeve.

In some other implementations, the collar body can include at least two collar body portions, each collar body portion having an inside wall partially defining a collar bore axially receiving the distal portion of the sleeve. In some embodiments, the collar body portions may define a socket of the ball-and-socket hinge joint of the radial extension. In some embodiments, the coupling apparatus can include a spring between the proximal end of the sleeve and a proximal end of one of the collar body portions, and the proximal end of the collar body portion may have a recess for receiving the spring. The lock may include at least one recess in the outside wall of the distal portion of the sleeve for receiving a clip.

In some other aspects, the invention concerns a linkage for use in a system having a fuel valve and an air damper. In some embodiments, the linkage can include an elongate threaded linkage rod and at least one coupling apparatus. In some embodiments, the coupling apparatus can include a sleeve, a collar, and a lock restraining axial movement of the collar body with respect to the sleeve. The sleeve may have an inside wall defining a bore with threading complementary to the threading of the linkage rod. The collar may circumscribe at least a portion of the sleeve, and have (i) a collar body and (ii) an about radial extension. In some embodiments, the fuel valve and/or the air damper can be engaged with the radial extension.

In some embodiments, the linkage can include a second lock restraining axial movement of the sleeve with respect to the linkage rod. In some embodiments, the radial extension of the collar may include a hinge joint. In some embodiments, the linkage can include an intermediate sleeve between the sleeve and the collar.

It is to be appreciated that coupling apparatuses in accordance with embodiments of the present invention reduce conventional wear, leading to a reduction in labor, operational, and maintenance costs. In addition, the ability to make very fine adjustments to the position of the coupling apparatus along the linkage rod enable more precise air/fuel ratio changes, improving the efficiency and extending the usable service life of the boiler. Furthermore, in contrast to conventional linkages, those in accordance with embodiments of the present invention permit changes to the air/fuel ratio to be made without turning off and on the equipment. Thus, fuel savings and a reduction in air contaminants may be realized.

These and other objects, advantages and features of the invention, together with the organization and manner of operation thereof, will become apparent from the following detailed description when taken in conjunction with the accompanying drawings, wherein like elements have like numerals throughout the several drawings described below.

BRIEF DESCRIPTION OF THE DRAWINGS

FIG. 1 is a diagram showing a conventional burner system.

FIG. 2 is a diagram showing a conventional linkage assembly.

FIGS. 5A-5G are diagrams illustrating exemplary collars in accordance with some embodiments of the present invention.

FIGS. 8A and 8B are perspective and exploded diagrams, respectively, illustrating an exemplary coupling apparatus having a rigid radial extension in accordance with some other embodiments of the present invention.

FIGS. 9A and 9B are perspective and exploded diagrams, respectively, illustrating an exemplary coupling apparatus having an inner ball in accordance with some other embodiments of the present invention.

DETAILED DESCRIPTION OF THE PREFERRED EMBODIMENTS

The invention, in its various aspects, will be explained in greater detail below. While the invention will be described in conjunction with several exemplary embodiments, the exemplary embodiments themselves do not limit the scope of the invention. Similarly, the exemplary embodiments as illustrated in the accompanying drawings do not limit the scope of the exemplary embodiments and/or invention. Rather the invention, as defined by the claims, may cover alternatives, modifications, and/or equivalents of the exemplary embodiments.

It is to be appreciated that although the invention is described in conjunction with boiler draft burner assemblies, several embodiments of the present invention also contemplate other applications. For example, and without limitation, some aspects of the invention may be practiced to finely adjust the positioning of a device along a linkage rod. In some examples, the invention may be practiced to link a plurality of air dampers of a fan or air handler assembly. In some other examples, the invention may be practiced to link precision instruments such as assembly line components.

Exemplary Apparatuses

Figure 3:
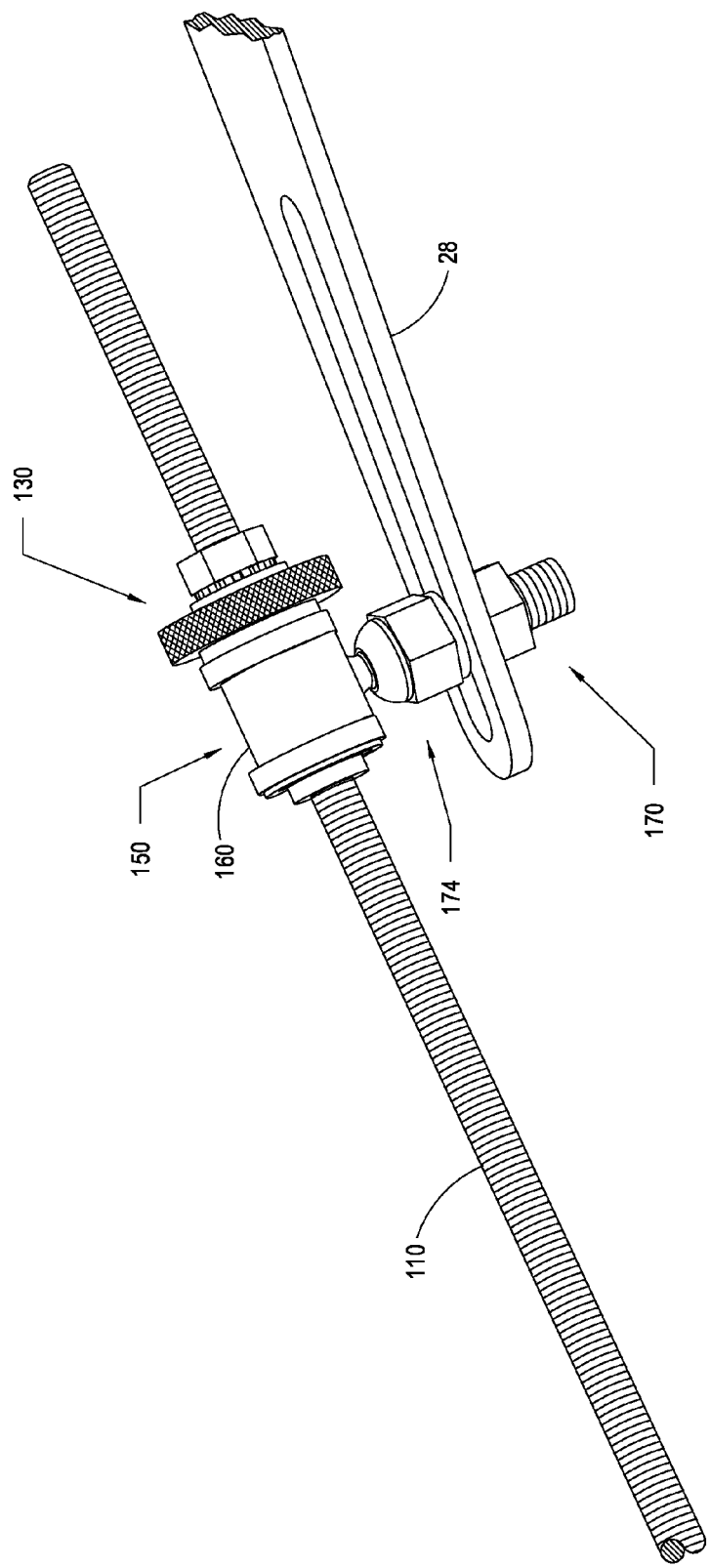
FIG. 3 is a diagram illustrating an exemplary linkage assembly in accordance with some embodiments of the present invention.

Referring now to the exemplary illustration of FIG. 3, in advantageous embodiments, an apparatus for adjustably coupling threaded linkage rod 110 to device 28 can include a sleeve 130, collar 150, and a lock restraining axial movement of collar 150 with respect to sleeve 130. As discussed below, sleeve 130 can have an inside threaded wall defining a bore axially receiving linkage rod 110. As discussed below, collar 150 can include collar body 160 having a bore axially receiving sleeve 130 and an about radial extension 170 for engagement to device 28.

The positioning of the coupling apparatus, including sleeve 130, collar 150, and extension 170 can be adjusted by rotation of sleeve 130. It is to be appreciated that the threading on linkage rod 110 and complementary threading on the inside wall of sleeve 130 may function as a screw. In some examples, and without limitation, as screw 130 is rotated, screw 130 (and thus collar 150 locked therewith) axially moves along linkage rod 110 in a first direction. In some examples, as screw 130 is counter-rotated, screw 130 (and thus collar 150 locked therewith) axially moves along linkage rod 110 in a second direction. It is to be appreciated that the pitch of the threading on linkage rod 110 (and thus complementary threading of sleeve 130) affects the amount of distance that sleeve 130 will traverse per rotation thereof. For example, threading having a high pitch enables finer adjustments to the position of the sleeve than does threading having a lower pitch.

Referring now to the exemplary illustrations of FIGS. 4A-4E, in some embodiments, sleeve 230 may include a proximal end 235 and an elongate distal end 237. Sleeve 230 may include threaded sleeve bore 231 which may have a diameter about equal to a diameter of the linkage rod (not shown). As shown, sleeve bore 231 may extend from an edge of proximal end 235 to an edge of distal portion 237 so as to define an axial opening though the entire body of sleeve 230 permitting reception of the linkage rod. In some embodiments, the sleeve may be formed from aluminum. In some embodiments, the sleeve may be formed from plastic. In some embodiments the sleeve may be formed from metal and the inner threaded sleeve bore may have a reduced friction coating. However, it is to be appreciated that sleeves having other materials and combinations thereof are contemplated in accordance with some embodiments of the present invention.

In some embodiments, proximal end 235 may have an outside wall with a diameter that is greater than a diameter of an outside wall of distal portion 237. For example, and without limitation, proximal end 235 may be larger than distal portion 237. However, it is to be appreciated that the proximal end may have the same or a smaller diameter than the distal portion in accordance with some embodiments of the present invention.

Figure 4C:
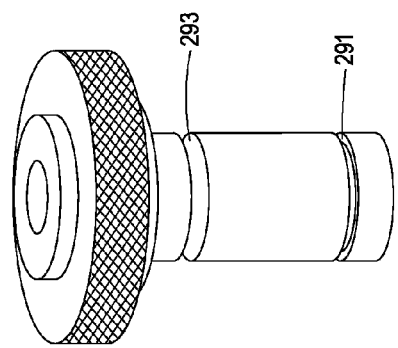
FIGS. 4A-4E are diagrams illustrating exemplary sleeves in accordance with some embodiments of the present invention.
Figure 4E:
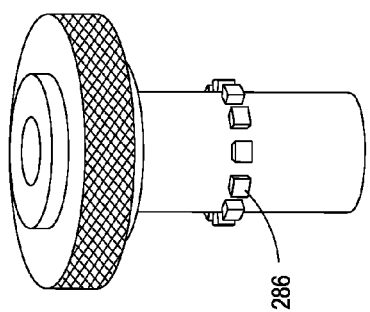
Figure 4B:
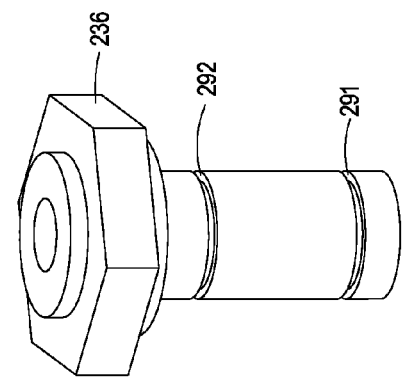
Figure 4D:
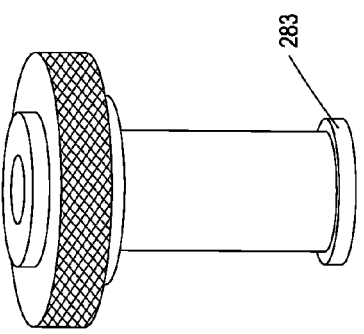
Figure 4A:
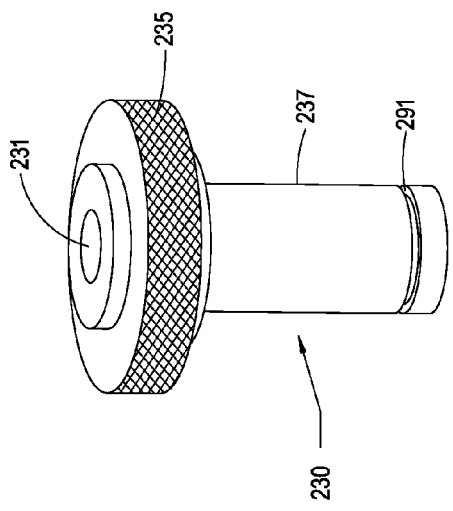

In some embodiments, and as shown in the exemplary illustration of FIG. 4A, proximal end 235 may have a machined outer surface. The machined outer surface increases friction that may be applied by an operator's finger to rotate sleeve 230 for axial movement about the linkage rod (for example, and without limitation, linkage rod 110 of FIG. 3). In some other embodiments, and as shown in the exemplary illustration of FIG. 4B, proximal end 236 may have a geometric outer surface. In some embodiments, the geometric surface may include at least three lateral faces. For example, and without limitation, proximal end 236 may have a hexagonal outer surface having six sides. However, it is to be appreciated that the proximal end may have other outer surfaces in accordance with some embodiments of the present invention.

Referring now to the exemplary illustrations of FIGS. 5A-5G, in some embodiments, collar 250 may include collar body 260 and collar extension 270. Collar body 260 may include collar bore 261 which may have a diameter about equal to a diameter of the sleeve. In some embodiments, the size and surfacing of collar bore 261 may be similar to the size and surfacing of an outside surface of the distal end of the sleeve. For example, and without limitation, the collar bore may have a smooth or near interference fit with the distal end of the sleeve. However, it is to be appreciated that other fittings are contemplated in accordance with some embodiments of the present invention. In some embodiments, the collar may be formed from aluminum. In some embodiments, the collar may be formed from plastic. In some embodiments the collar may be formed from metal and the inner collar bore may have a reduced friction coating. However, it is to be appreciated that collars having other materials and combinations thereof are contemplated in accordance with some embodiments of the present invention.

In some embodiments, extension 270 may include a bolt 277 for engaging collar body 260 to a device. In some examples, and without limitation, bolt 277 may be threaded permitting a nut (not shown) to secure extension 270 to a device. However, it is to be appreciated that other means of engaging collar body 260 to a device are contemplated in accordance with some embodiments of the present invention. For example, and without limitation, extension 270 may form part of the device to which collar body 260 is engaged. In other examples, extension 270 may be one part of a snap-fit connector for cooperating with another part of the snap fit connector which may be on the device.

In some embodiments, extension 270 may include hinge joint 274 permitting movement of extension 270 with respect to collar body 260. In some preferred embodiments, and without limitation, hinge joint 274 can include a ball-and-socket joint. In some examples, and without limitation, bolt 277 may have a socket for receiving a ball integrally formed on collar body 260. In some other examples, and as illustrated below, the bolt may have a ball received in a socket formed in the collar body. However, it is to be appreciated that other hinge joints are contemplated in accordance with some embodiments of the present invention. For example, and without limitation, the hinge joint may include an ellipsoid joint, a saddle joint, or a pivot joint. In some other embodiments, extension 270 may be rigidly connected to collar body 260. As such, movement of extension 270 with respect to collar body 260 may be restrained. In some other embodiments, extension 270 may be integrally formed on collar body 260.

In some embodiments, and referring to the exemplary illustration of FIG. 5B, the collar body may include at least two collar body portions. For example, and without limitation, the collar body may include collar body portion 262 and collar body portion 263. In some embodiments, each of collar body portions 262 and 263 may have an inside wall partially defining collar bore 261. It is to be appreciated that the collar body may include any number of collar body portions in accordance with some embodiments of the present invention. In some examples, and without limitation, the collar body portions may be secured to one another by one or more bolts. In some other examples, the collar body portions may be secured to one another by screws, snap-fit connections, or clamps. It is to be appreciated that other securing methods are contemplated in accordance with some embodiments of the present invention.

In some embodiments, and referring to the exemplary illustration of FIG. 5D, the collar body may include inner ball 265 and a socket receiving inner ball 265 and permitting rotation therein. Inner ball 265 may have an axial opening defining collar bore 261.

In some embodiments, and referring briefly to the exemplary illustrations of FIGS. 11B-11H, collar body 860 may include a recess 894 for releasable engagement with ball 844. In some embodiments, the coupling apparatus may also include an intermediate sleeve 840 between collar body 860 and sleeve 830. In some embodiments, intermediate sleeve 840 may have an axial opening defining collar bore 841. A distal portion 847 of intermediate sleeve 840 may have a tapered opening 843. In some embodiments, ball 844 having a diameter greater than a diameter of tapered opening 843 may be positioned between sleeve 830 and tapered opening 843.

As above, in advantageous embodiments, apparatuses can include a lock restraining axial movement of the collar with respect to the sleeve. In some examples, and without limitation, the lock can comprise complementary features on each of the collar and the sleeve. In some embodiments, and as shown in the exemplary illustration of FIG. 11H, axial movement of collar body 860 with respect to the intermediate sleeve may be restrained by cooperation of recess 894, ball 844, and tapered opening 843. In some further embodiments, axial movement of the intermediate sleeve with respect to the sleeve may be restrained by cooperation of inwardly protruding member 885 on the distal end of the intermediate sleeve and sleeve recess 895.

In some examples, and without limitation, the recess can include a well, a groove, a slot, or combinations thereof. However, it is appreciated that other types of recesses are contemplated in accordance with some embodiments of the present invention.

Figure 6B:
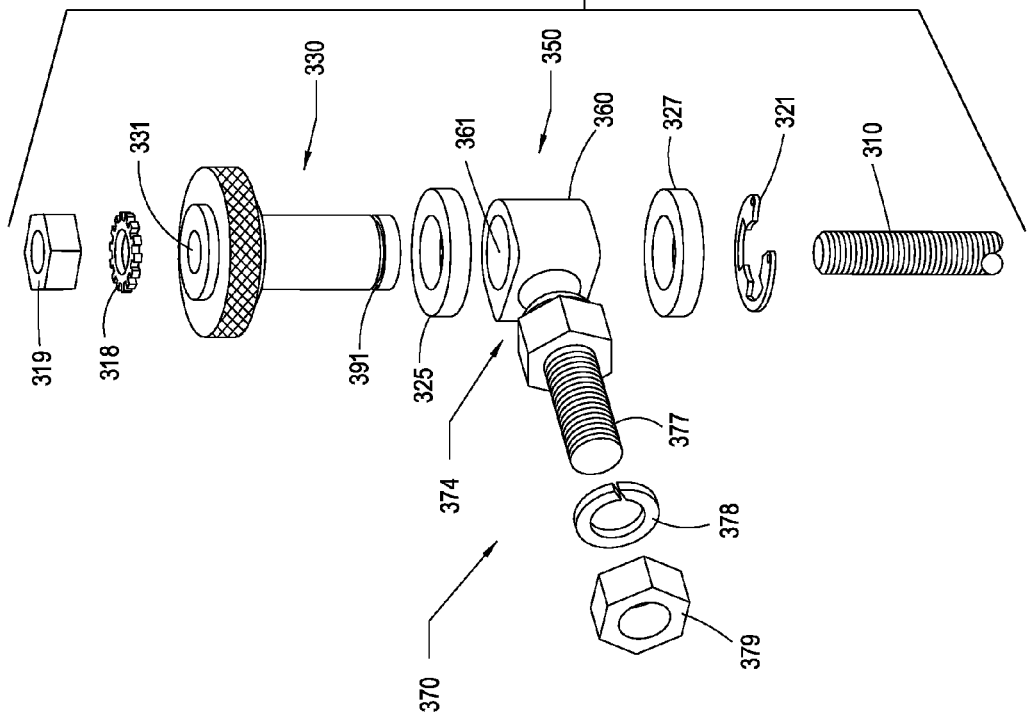
FIGS. 6A and 6B are perspective and exploded diagrams, respectively, illustrating an exemplary coupling apparatus having one lock in accordance with some embodiments of the present invention.

In some other embodiments, and referring to the exemplary illustration of FIG. 4A, the lock can include recess 291 in distal portion 237 of sleeve 230 for receiving a clip (for example, and without limitation, clip 321 as shown in FIG. 6B). In some examples, and without limitation, the clip can be an e-type clip, a c-type clip, or an r-type clip. However, it is to be appreciated that other clips for retaining individual components of the apparatus are contemplated in accordance with some embodiments of the present invention.

Figure 7B:
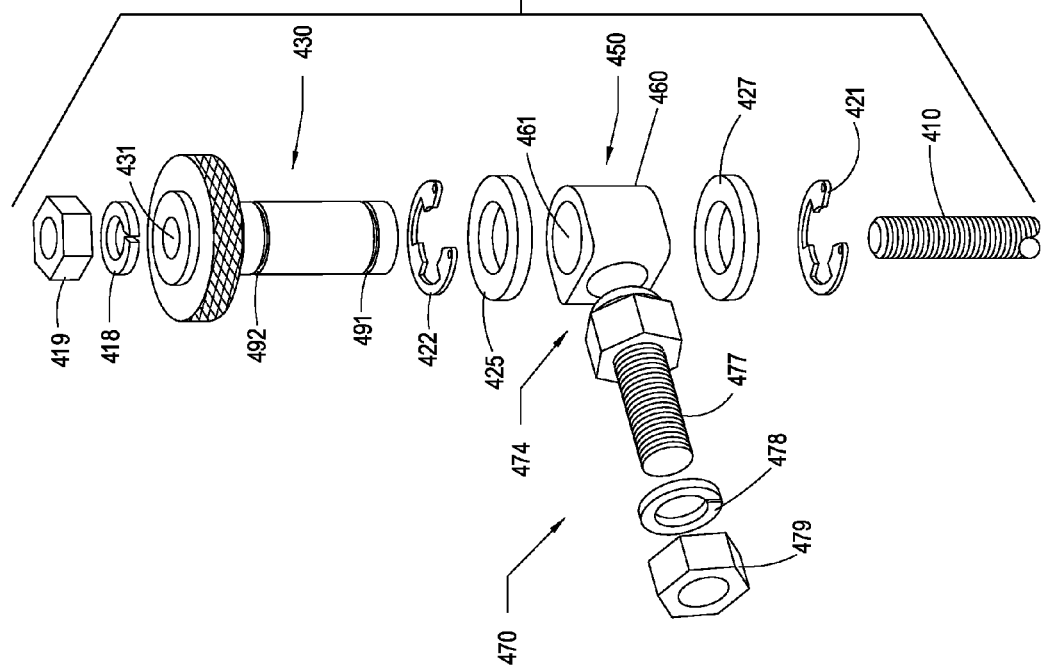
FIGS. 7A and 7B are perspective and exploded diagrams, respectively, illustrating an exemplary coupling apparatus having two locks in accordance with some other embodiments of the present invention.

In some other embodiments, and referring to the exemplary illustration of FIG. 4B, the lock can include a first recess 291 and a second recess 292 in the distal portion of the sleeve for receiving a first and a second clip (for example, and without limitation, clip 421 and clip 422, respectively, as shown in FIG. 7B). It is to be appreciated that any number of recesses and complementary features can be included in accordance with some embodiments of the present invention. It is also to be appreciated that the distal portion of the sleeve can have recesses of varying types and at varying locations in accordance with some embodiments of the present invention. In some embodiments, and referring to the exemplary illustration of FIG. 4C, the sleeve can include recess 291 of a first type at a first location and recess 293 of a different type at a different location.

In some other embodiments, the lock can include at least one recess in the distal portion of the sleeve for receiving a protrusion on an inside wall of the collar body. In some embodiments, and referring back to the exemplary illustration of FIG. 4B, the lock can include a first recess 291 and a second recess 292 in the distal portion of the sleeve for receiving a first and a second protrusion on the inside wall of the collar body (for example, and without limitation, protrusion 281 and protrusion 282, respectively, as shown in FIG. 5C). In some embodiments, and as shown in the exemplary illustration of FIG. 5C, protrusion 281 and protrusion 282 may be rigid members of the collar body (and or collar body portions). In some other embodiments, and as shown in the exemplary illustration of FIG. 5F, protrusions 285 may be spring loaded balls. It is to be appreciated that other types of protrusions are contemplated in accordance with some embodiments of the present invention. For example, and without limitation, the protrusions may be spring loaded tabs or deformable tabs. It is also to be appreciated that the inside wall of the collar body may include a combination of types of protrusions. For example, the inside wall of the collar body may include both rigid members and spring loaded balls.

In some other embodiments, and referring to the exemplary illustration of FIG. 5G, the lock can include recess 294 in an inside wall of the collar body for receiving a protrusion on an outside wall of the sleeve (for example, and without limitation, protrusion 286 as shown in FIG. 4E).

In some other embodiments, and referring to the exemplary embodiment of FIG. 4D, the lock can include enlarged distal end 283 on the sleeve for abutting a distal end of the collar body. It is to be appreciated that distal end 283 must have a diameter that is greater than a diameter of the collar bore of the collar body to restrain the collar body from movement from the sleeve. Distal end 283 may be a rigid member integrally formed on the sleeve. However, it is to be appreciated that deformable members may be provided on the distal end of the sleeve for abutting a distal end of the collar body. In some embodiments, the sleeve may include one or more spring loaded balls, spring loaded tabs, or deformable tabs on a distal end thereof.

An Exemplary Coupling Apparatus

In some embodiments, a coupling apparatus for a threaded linkage rod can include a sleeve, a collar circumscribing at least a portion of the distal portion of the sleeve, and a lock restraining axial movement of the collar body with respect to the sleeve. The sleeve may have an inside threaded wall defining a bore for axially receiving the linkage rod. The sleeve may also have a proximal end and an elongate distal portion. In some embodiments, the diameter of the outside wall of the proximal end of the sleeve can be greater than an outside wall of the distal portion of the sleeve. In some embodiments, the outside wall of the proximal end may have a machined surface. In some other embodiments, the outside wall of the proximal end may have a geometric surface with at least three faces.

Figure 6A:
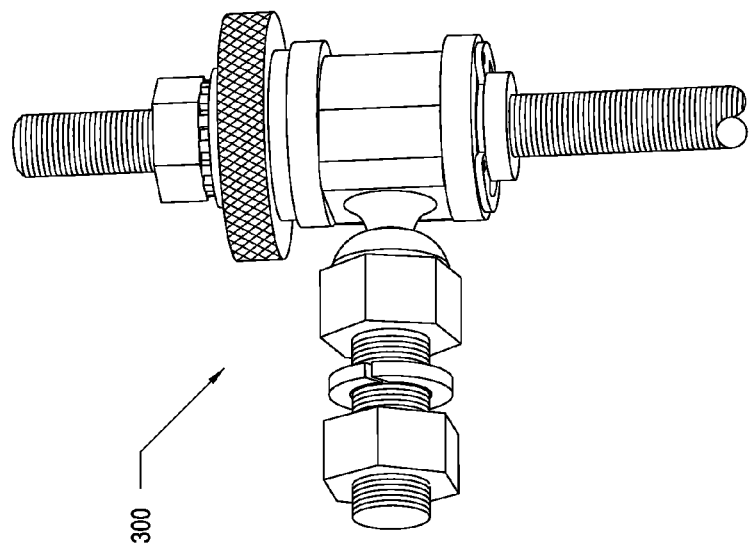

In some embodiments, the collar can include (i) a collar body and (ii) an about radial extension. In some preferred embodiments, and referring to the exemplary illustrations of FIGS. 6A-6B, coupling apparatus 300 may include sleeve 330 having an inside threaded wall defining sleeve bore 331 axially receiving linkage rod 310. Collar body 360 of collar 350 may have an inside wall defining collar bore 361 axially receiving the distal portion of sleeve 330. The lock may include recess 391 in a distal end of sleeve 330 for receiving clip 321. In some embodiments, a second lock may be provided for restraining movement of sleeve 330 with respect to linkage rod 310. For example, and without limitation, the second lock may include machine washer 318 and hex nut 319. However, it is to be appreciated that other secondary locks are contemplated in accordance with some embodiments of the present invention. For example, and without limitation, the second lock can include a lock nut.

In some embodiments, extension 370 of collar 350 may include threaded bolt 377 and a fastener for securely attaching a device (for example, and without limitation, an actuator arm) thereto. In some examples, and without limitation, the fastener can include split washer 378 and hex nut 379. However, it is to be appreciated that other fasteners are contemplated in accordance with some embodiments of the present invention.

In some embodiments, extension 370 may include hinge joint 374 permitting movement of extension 370 with respect to collar body 360. In some embodiments, hinge joint 374 can comprise a ball-and-socket hinge joint. However, it is to be appreciated that other hinge joints are contemplated in accordance with some embodiments of the present invention.

In some embodiments, the coupling apparatus can include at least one washer. In some examples, and without limitation, washer 327 can be provided between collar body 360 and clip 321. In some other examples, washer 325 can be provided between collar body 360 and the proximal end of sleeve 330. It is to be appreciated that other types and locations of washers are contemplated in accordance with some embodiments of the present invention.

Another Exemplary Coupling Apparatus

Figure 7A:
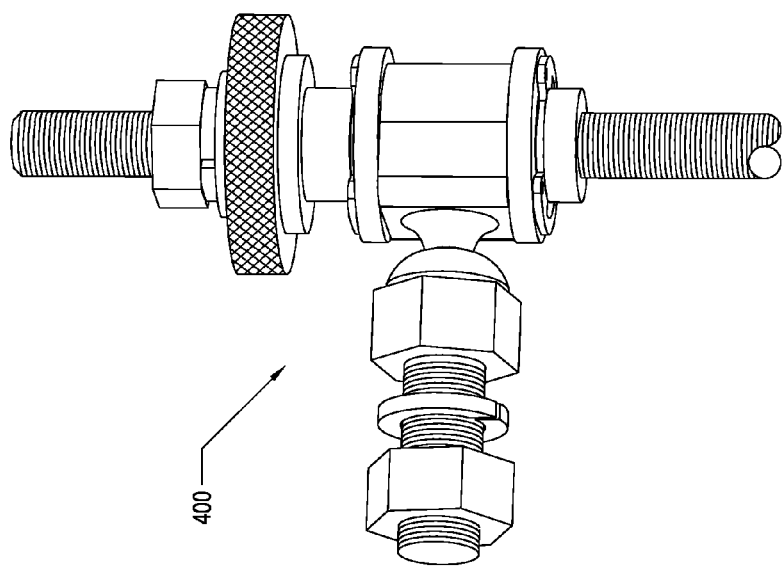

In some other preferred embodiments, and referring to the exemplary illustrations of FIGS. 7A-7B, coupling apparatus 400 may include sleeve 430 having an inside threaded wall defining sleeve bore 431 axially receiving linkage rod 410. Collar body 460 of collar 450 may have an inside wall defining collar bore 461 axially receiving the distal portion of sleeve 430. The lock may include first recess 491 and second recess 492 in a distal end of sleeve 430 for receiving first clip 421 and second clip 422, respectively. In some embodiments, a second lock may be provided for restraining movement of sleeve 430 with respect to linkage rod 410. For example, and without limitation, the second lock may include lock washer 418 and hex nut 419. However, it is to be appreciated that other secondary locks are contemplated in accordance with some embodiments of the present invention. For example, and without limitation, the second lock can include a lock nut.

In some embodiments, extension 470 of collar 450 may include threaded bolt 477 and a fastener for securely attaching a device (for example, and without limitation, an actuator arm) thereto. In some examples, and without limitation, the fastener can include split washer 478 and hex nut 479. However, it is to be appreciated that other fasteners are contemplated in accordance with some embodiments of the present invention.

In some embodiments, extension 470 may include hinge joint 474 permitting movement of extension 470 with respect to collar body 460. In some embodiments, hinge joint 474 can comprise a ball-and-socket hinge joint. However, it is to be appreciated that other hinge joints are contemplated in accordance with some embodiments of the present invention.

In some embodiments, the coupling apparatus can include at least one washer. In some examples, and without limitation, washer 427 can be provided between collar body 460 and clip 421. In some other examples, washer 425 can be provided between collar body 460 and clip 422. It is to be appreciated that other types and location of washers are contemplated in accordance with some embodiments of the present invention.

Another Exemplary Coupling Apparatus

In some other preferred embodiments, and referring to the exemplary illustrations of FIGS. 8A-8B, coupling apparatus 500 may include sleeve 530 having an inside threaded wall defining sleeve bore 531 axially receiving linkage rod 510. Collar body 560 of collar 550 may have an inside wall defining collar bore 561 axially receiving the distal portion of sleeve 530. The lock may include recess 591 in a distal end of sleeve 530 for receiving clip 521. In some embodiments, a second lock may be provided for restraining movement of sleeve 530 with respect to linkage rod 510. For example, and without limitation, the second lock may include split washer 518 and hex nut 519. However, it is to be appreciated that other secondary locks are contemplated in accordance with some embodiments of the present invention. For example, and without limitation, the second lock can include a lock nut.

In some embodiments, extension 570 of collar 550 may include threaded bolt 577 and a fastener for securely attaching a device (for example, and without limitation, an actuator arm) thereto. In some examples, and without limitation, the fastener can include split washer 578 and hex nut 579. However, it is to be appreciated that other fasteners are contemplated in accordance with some embodiments of the present invention.

In some embodiments, extension 570 may be rigidly attached to collar body 560 restricting movement of extension 570 with respect to collar body 560. However, it is to be appreciated that extension 570 may include a hinge permitting movement in accordance with some embodiments of the present invention.

In some embodiments, the coupling apparatus can include at least one washer. In some examples, and without limitation, washer 527 can be provided between collar body 560 and clip 521. In some other examples, washer 525 can be provided between collar body 560 and the proximal end of sleeve 530. It is to be appreciated that other types and locations of washers are contemplated in accordance with some embodiments of the present invention.

Another Exemplary Coupling Apparatus

In some other preferred embodiments, and referring to the exemplary illustrations of FIGS. 9A-9B, coupling apparatus 600 may include sleeve 630 having an inside threaded wall defining sleeve bore 631 axially receiving linkage rod 610. Collar body 660 may include (i) inner ball 665 and (ii) an inner wall defining a socket receiving inner ball 665. Inner ball 665 may have an opening therein defining collar bore 661 axially receiving the distal portion of sleeve 630. In some embodiments, extension 670 may be rigidly attached to collar body 660 restricting movement of extension 670 with respect to collar body 660. However, it is to be appreciated that extension 670 may include a hinge permitting movement in accordance with some embodiments of the present invention.

The lock may include recess 691 in a distal end of sleeve 630 for receiving clip 621 to restrain axial movement of inner ball 661 (or collar 650 generally) with respect to sleeve 630. In some embodiments, a second lock may be provided for restraining movement of sleeve 630 with respect to linkage rod 610. For example, and without limitation, the second lock may include split washer 618 and hex nut 619. However, it is to be appreciated that other secondary locks are contemplated in accordance with some embodiments of the present invention. For example, and without limitation, the second lock can include a lock nut.

In some embodiments, extension 670 of collar 650 may include threaded bolt 677 and a fastener for securely attaching a device (for example, and without limitation, an actuator arm) thereto. In some embodiments, bolt 677 may be integrally formed with collar body 660. In some other embodiments, bolt 677 may be welded or securely fixed to collar body 660. In some examples, and without limitation, the fastener can include split washer 678 and hex nut 679. However, it is to be appreciated that other fasteners are contemplated in accordance with some embodiments of the present invention.

In some embodiments, the coupling apparatus can include at least one washer. In some examples, and without limitation, washer 627 can be provided between inner ball 665 of collar body 660 and clip 621. In some other examples, washer 625 can be provided between inner ball 665 of collar body 660 and the proximal end of sleeve 630. It is to be appreciated that other types and location of washers are contemplated in accordance with some embodiments of the present invention.

Another Exemplary Coupling Apparatus

Figure 10:
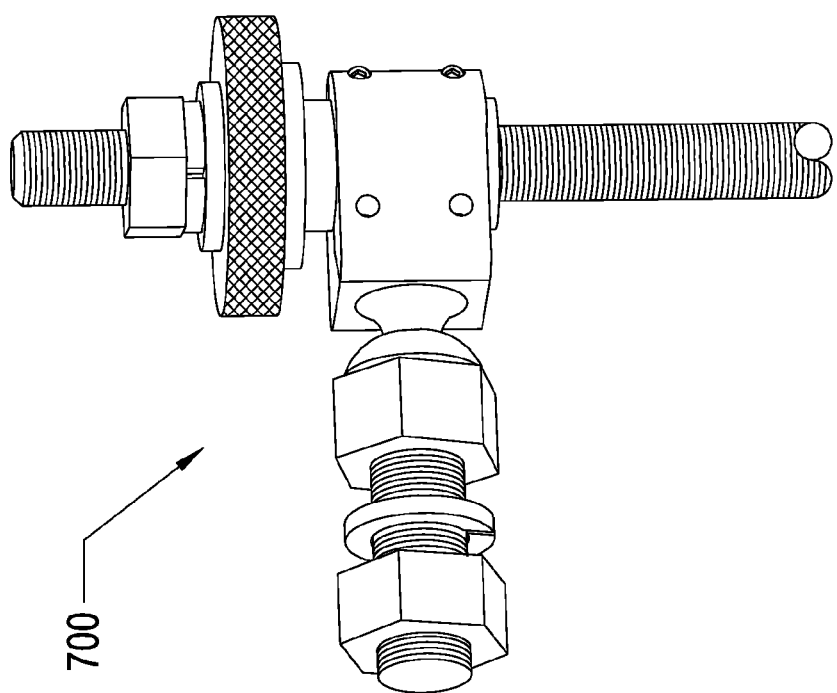
FIGS. 10A and 10B are perspective and exploded diagrams, respectively, illustrating an exemplary coupling apparatus having two collar portions in accordance with some other embodiments of the present invention.
Figure 10B:
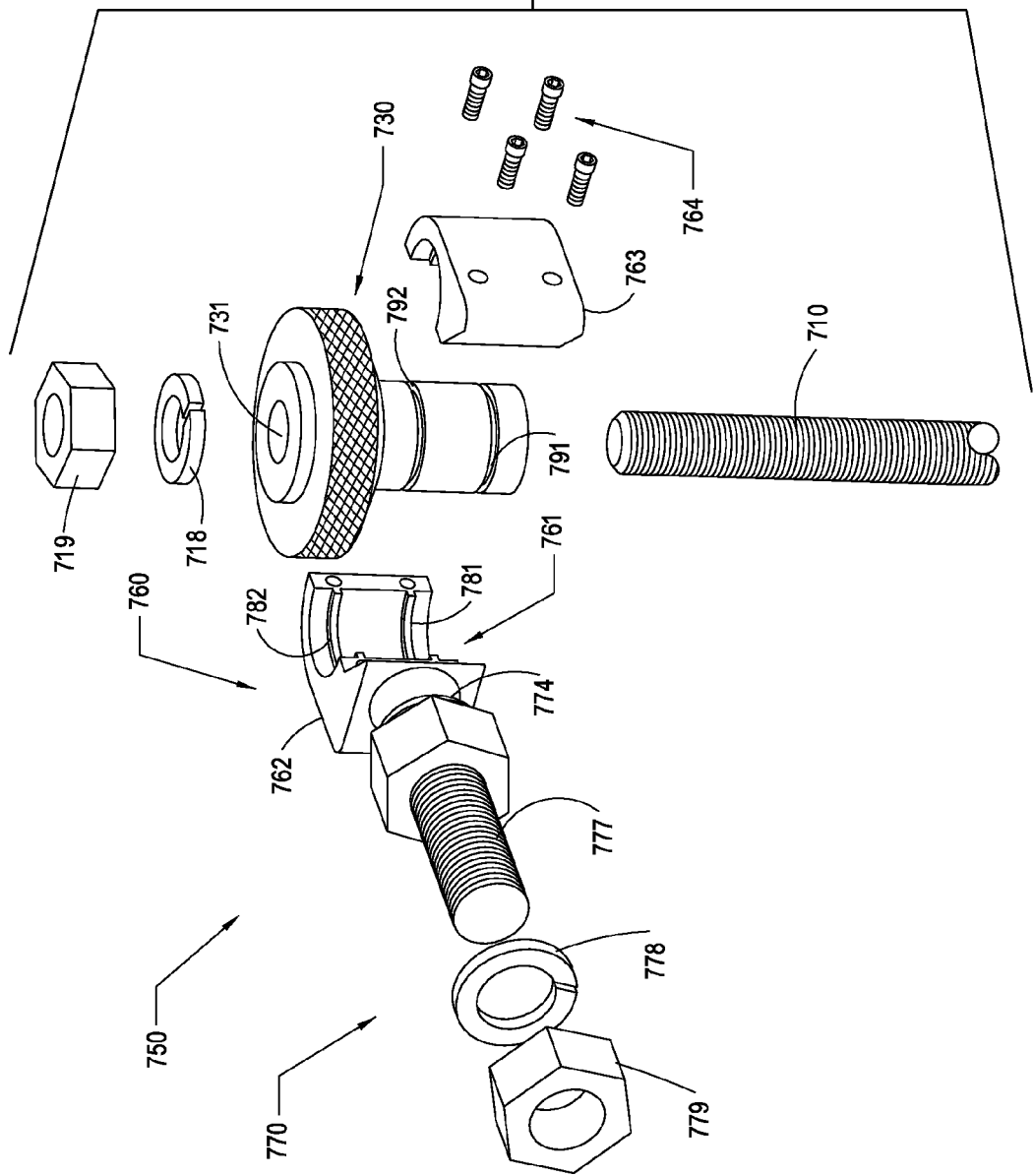

In some other preferred embodiments, and referring to the exemplary illustrations of FIGS. 10A-10B, coupling apparatus 700 may include sleeve 730 having an inside threaded wall defining sleeve bore 731 axially receiving linkage rod 710. In some embodiments, collar body 760 of collar 750 may have at least two collar body portions. First collar body portion 762 and second collar body portion 763 may each have an inside wall partially defining collar bore 761 for axially receiving the distal portion of sleeve 730. The lock may include first recess 791 and second recess 792 in a distal end of sleeve 730 for receiving first protrusion 781 and second protrusion 782, respectively, of the collar body portions. In some embodiments, the collar body portions (for example, and without limitation, first collar body portion 762 and second collar body portion 763) may be coupled by screws 764. However, it is to be appreciated that the collar body portions may be coupled by other means in accordance with some embodiments of the present invention. For example, and without limitation, the collar body portions may be coupled by one or more bolts, snap rings, e-type clips, c-type clips, snap-fit connections and/or clamps.

It is to be appreciated that collar body 760 may include any number of collar body portions, the distal end of the sleeve may include any number of protrusions, and the collar body portions may include any number of recesses, each in accordance with some embodiments of the present invention.

In some embodiments, a second lock may be provided for restraining movement of sleeve 730 with respect to linkage rod 710. For example, and without limitation, the second lock may include split washer 718 and hex nut 719. However, it is to be appreciated that other secondary locks are contemplated in accordance with some embodiments of the present invention. For example, and without limitation, the second lock can include a lock nut.

In some embodiments, extension 770 of collar 750 may include threaded bolt 777 and a fastener for securely attaching a device (for example, and without limitation, an actuator arm) thereto. In some examples, and without limitation, the fastener can include split washer 778 and hex nut 779. However, it is to be appreciated that other fasteners are contemplated in accordance with some embodiments of the present invention.

In some embodiments, extension 770 may include hinge joint 774 permitting movement of extension 770 with respect to collar body 760. In some embodiments, hinge joint 774 can comprise a ball-and-socket hinge joint. However, it is to be appreciated that other hinge joints are contemplated in accordance with some embodiments of the present invention.

An Exemplary quick Release Coupling Apparatus

In some other preferred embodiments, and referring to the exemplary illustrations of FIGS. 11A-11H, a quick release coupling apparatus 800 can include sleeve 830, intermediate sleeve 840, and collar 850. In some embodiments, sleeve 830 may have an inside threaded wall defining sleeve bore 831 axially receiving linkage rod 810. Intermediate sleeve 840 may have an axial opening defining intermediate sleeve bore 841 receiving the distal end of sleeve 830. Collar body 860 of collar 850 may have an inside wall defining collar bore 861 axially receiving a distal portion of intermediate sleeve 840. In some embodiments, spring 842 can be provided between proximal end 835 of sleeve 830 and proximal end 845 of intermediate sleeve 840.

Figure 11:
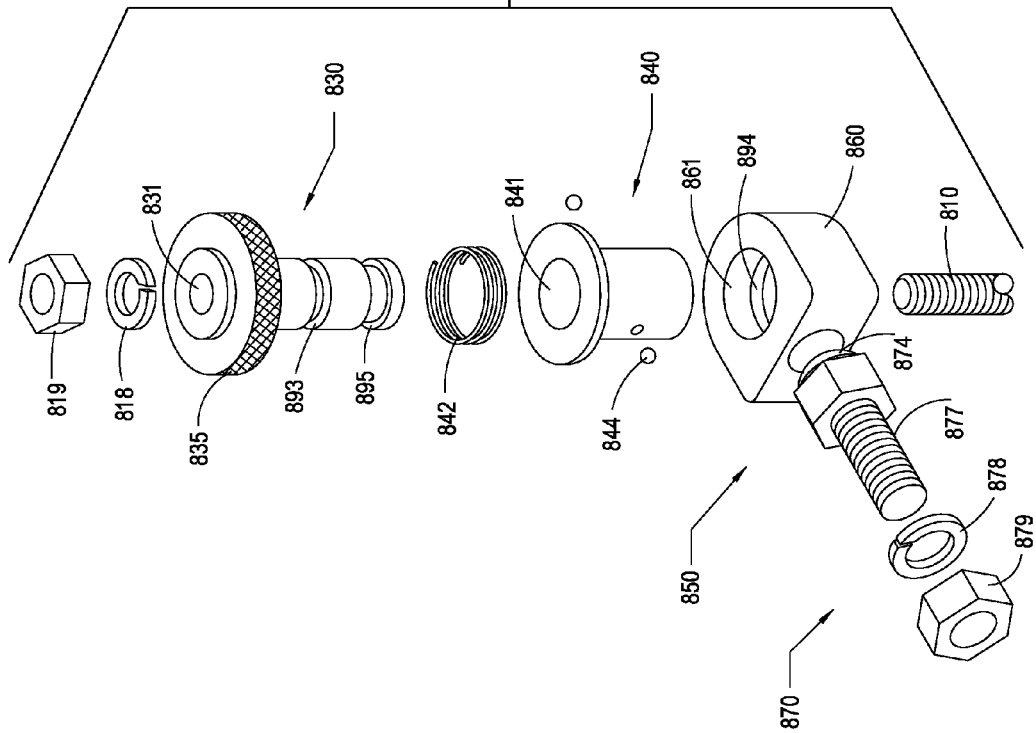
FIGS. 11A and 11B are perspective and exploded diagrams, respectively, illustrating an exemplary quick release coupling apparatus in accordance with some other embodiments of the present invention.
FIG. 11C is a diagram illustrating the exemplary sleeve of FIG. 11B in accordance with some embodiments of the present invention.
FIG. 11D is a diagram illustrating the exemplary intermediate sleeve of FIG. 11B in accordance with some embodiments of the present invention.
FIGS. 11E-11G are perspective, side, and top view diagrams illustrating the exemplary collar of FIG. 11B in accordance with some embodiments of the present invention.
FIG. 11H is a cross-sectional side view diagram illustrating the exemplary coupling apparatus of FIG. 11A in accordance with some embodiments of the present invention.
Figure 11:
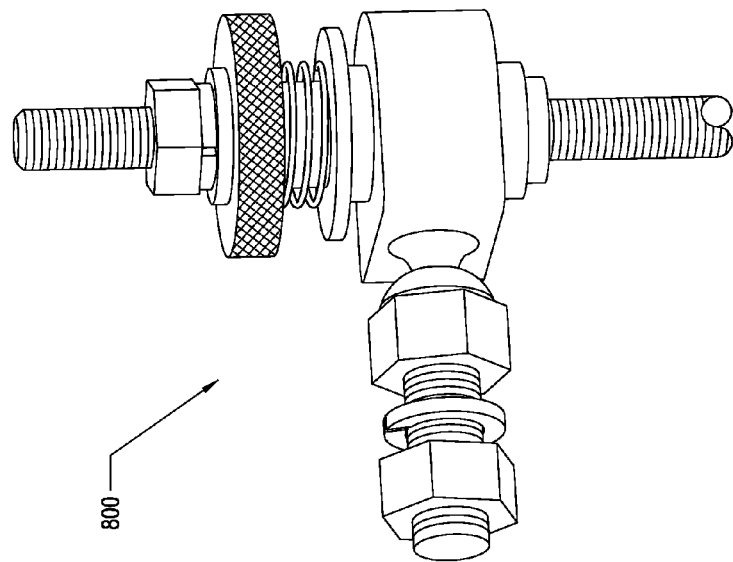
Figure 11:
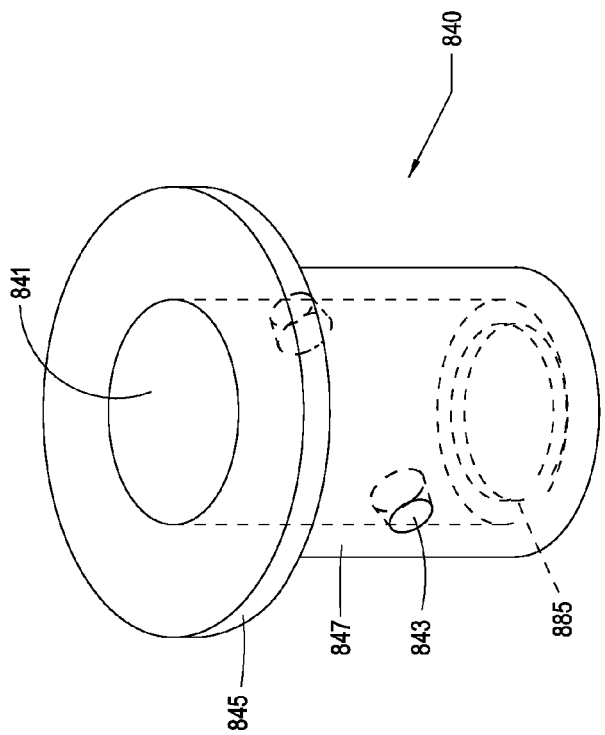
Figure 11:
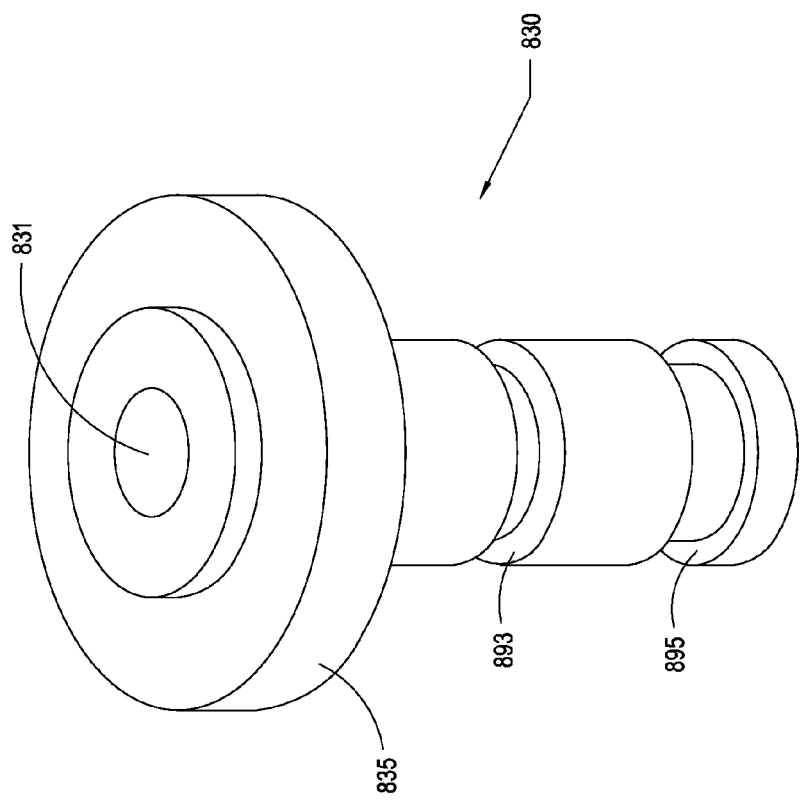
Figure 11:
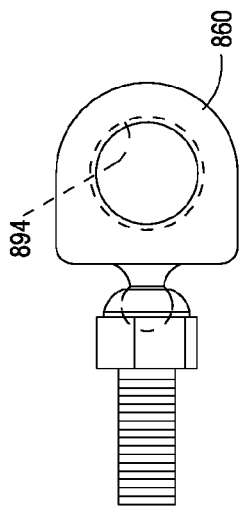
Figure 11:
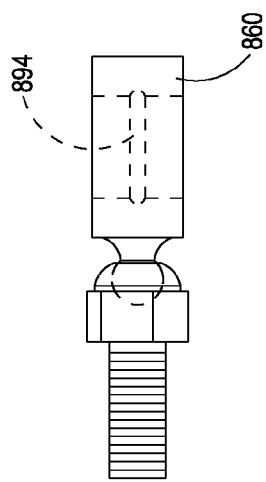
Figure 11:
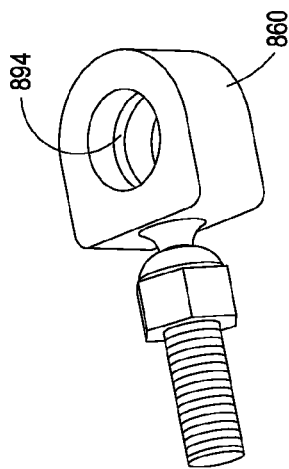
Figure 11:
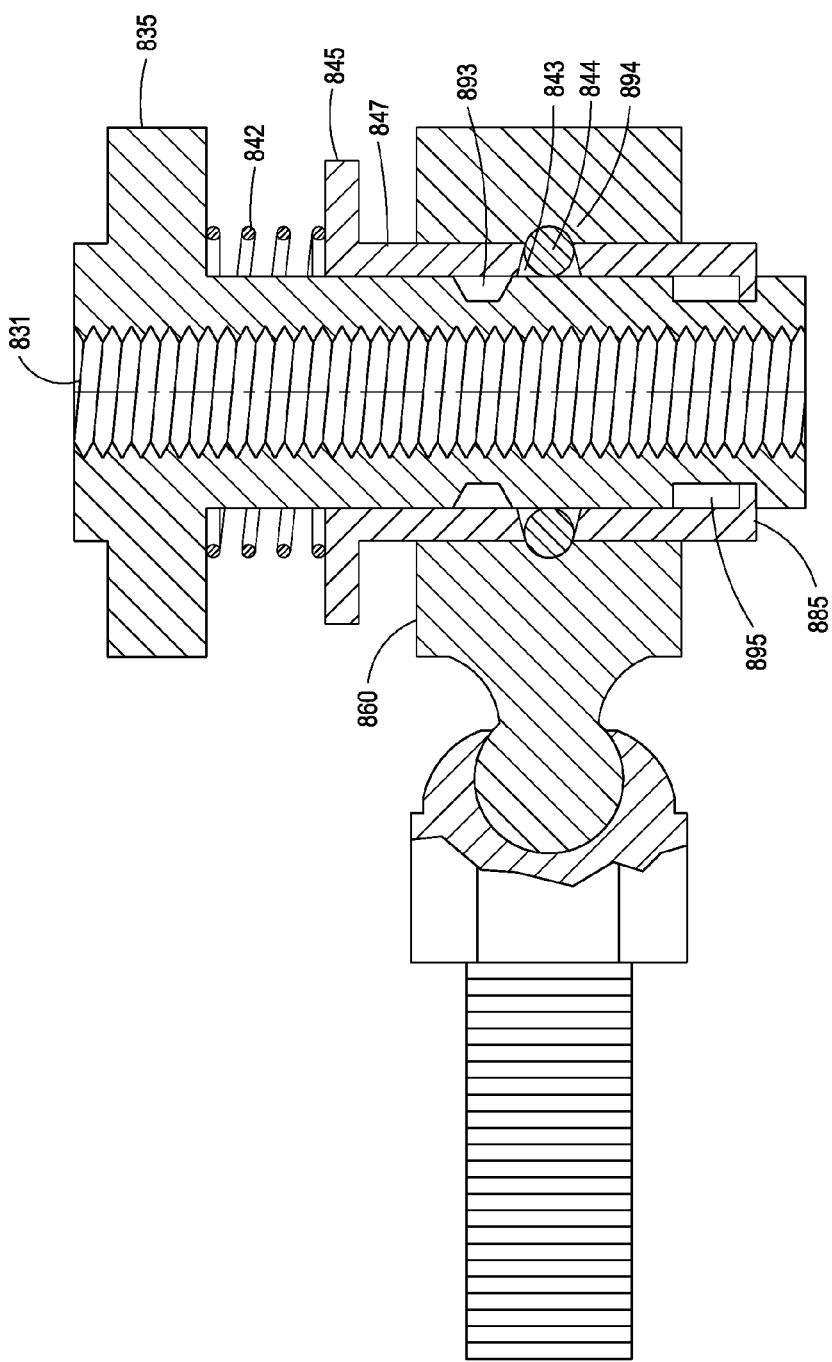

Referring now particularly to the exemplary illustration of FIG. 11C, in some embodiments, sleeve 830 can include proximal end 835 and a distal portion. In some embodiments, proximal end 835 may have a diameter that is greater than distal portion. As discussed more fully below, the distal portion of sleeve 830 can include ball release well 893 and recess 895. However, it is to be appreciated that the sleeve may include other wells, recesses, or protrusions in accordance with some embodiments of the present invention.

Referring now particularly to the exemplary illustration of FIG. 11D, in some embodiments, intermediate sleeve 840 may have wall 847 with at least one tapered opening 843 therein. In some embodiments, a ball (for example, and without limitation, ball 844 of FIG. 11B) may be received in opening 843. In some embodiments, ball 844 may have a diameter that is greater than a diameter of the outer edge of opening 843 such that ball 844 is restrained from being removed there through. In some embodiments, intermediate sleeve 840 may also include inwardly protruding distal end 885. In some examples, and without limitation, protruding distal end 885 may be circumferential about the distal end of intermediate sleeve 840. However, it is to be appreciated that the intermediate sleeve may include other protrusions in accordance with some embodiments of the present invention. For example, and without limitation, the distal end may include spring loaded tabs or spring loaded balls. It is also to be appreciated that the intermediate sleeve may include recesses on an inner wall of the distal portion in accordance with some embodiments of the present invention.

Referring now particularly to the exemplary illustration of FIGS. 11E-11F, in some embodiments, the inside wall of collar body 860 may include a recess or socket 894. In some examples, and without limitation, the diameter of socket 894 may be about equal to that of the diameter of the outer edge of the opening in the intermediate sleeve (for example, and without limitation, opening 843 of FIG. 11D).

Referring now particularly to the exemplary illustration of FIG. 11H, it can be appreciated that collar body 860 can be engaged and disengaged from the intermediate sleeve and thus the sleeve by cooperation of spring 842 and ball 844. In an engaged mode, spring 842 may press proximal end 845 of the intermediate sleeve away from proximal end 835 of the sleeve. Ball 844 located in opening 843 of wall 847 of the intermediate sleeve can be pressed radially outward from an outer wall of the distal portion of the sleeve such that it protrudes slightly into socket 894 of collar body 860. Collar body 860 may thusly be restrained from axial movement with respect to the intermediate sleeve by a first lock which may include ball 844 received in socket 894. In some embodiments, the intermediate sleeve may be restrained from axial movement with respect to the sleeve by a second lock, which in some examples, and without limitation, may include protruding distal end 885 of the intermediate sleeve received in recess 895 of the sleeve.

To disengage collar body 860 from the intermediate sleeve, in some examples, and without limitation, proximal end 845 of the intermediate sleeve may be drawn towards proximal end 835 of the sleeve compressing spring 842. As the intermediate sleeve moves, ball 844 in opening 843 moves axially along the sleeve until it can move radially inward into well 893, at which time it may no longer protrude into socket 894 of collar body 860. Collar body 860 may then be moved way from proximal end 845 of the intermediate sleeve and removed therefrom.

Referring back to the exemplary illustration of FIG. 11B, in some embodiments, an additional lock may be provided for restraining movement of sleeve 830 with respect to linkage rod 810. For example, and without limitation, the additional lock may include split washer 818 and hex nut 819. However, it is to be appreciated that other locks are contemplated in accordance with some embodiments of the present invention. For example, and without limitation, the additional lock can include a machine washer or a lock nut.

In some embodiments, extension 870 of collar 850 may include threaded bolt 877 and a fastener for securely attaching a device (for example, and without limitation, an actuator arm) thereto. In some examples, and without limitation, the fastener can include split washer 878 and hex nut 879. However, it is to be appreciated that other fasteners are contemplated in accordance with some embodiments of the present invention.

In some embodiments, extension 870 may include hinge joint 874 permitting movement of extension 870 with respect to collar body 860. In some embodiments, hinge joint 874 can comprise a ball-and-socket hinge joint. However, it is to be appreciated that other hinge joints are contemplated in accordance with some embodiments of the present invention.

Another Exemplary quick Release Coupling Apparatus

In some other preferred embodiments, and referring to the exemplary illustrations of FIGS. 12A-12H, a quick release coupling apparatus 900 can include sleeve 930 and collar 950 having collar body 960 including at least two collar body portions (for example, and without limitation, collar body portion 965 and collar body portion 966). In some embodiments, sleeve 930 may have an inside threaded wall defining sleeve bore 931 axially receiving linkage rod 910.

Figure 12:
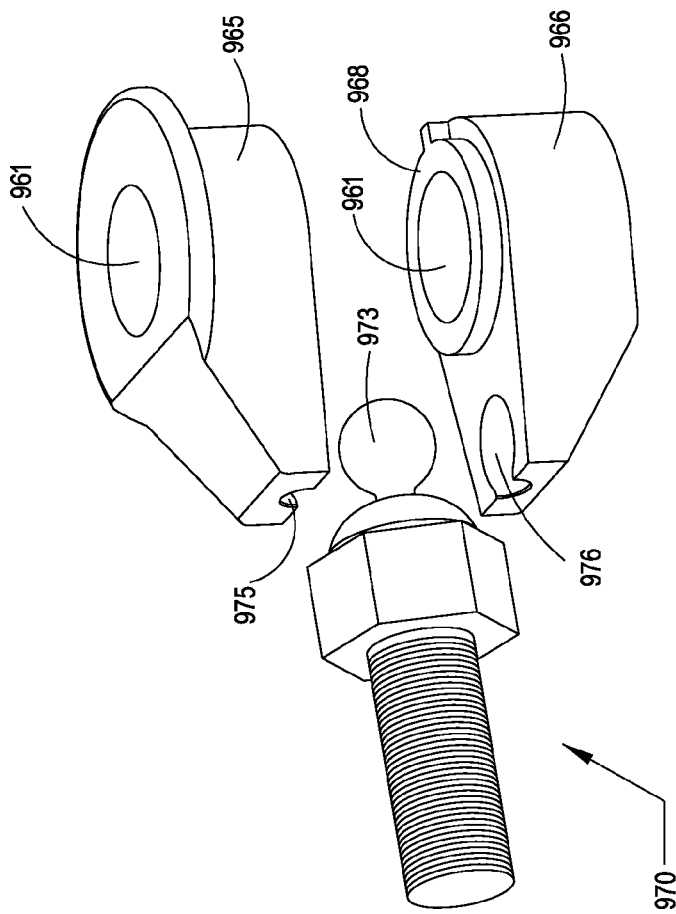
FIGS. 12A and 12B are perspective and exploded diagrams, respectively, illustrating an exemplary quick release coupling apparatus in accordance with some other embodiments of the present invention.
FIG. 12C is a top view diagram illustrating the exemplary collar of FIG. 12B in accordance with some embodiments of the present invention.
FIG. 12D is an exploded diagram illustrating a portion of the exemplary coupling apparatus of FIG. 12A in accordance with some embodiments of the present invention.
FIG. 12E is a side view diagram illustrating the exemplary collar of FIG. 12B in accordance with some embodiments of the present invention.
FIG. 12F is a rear view diagram illustrating the exemplary collar of FIG. 12B in accordance with some embodiments of the present invention.
FIG. 12G is an exploded diagram illustrating the exemplary collar of FIG. 12B in accordance with some embodiments of the present invention.
FIG. 12H is a cross-sectional side view diagram illustrating the exemplary coupling apparatus of FIG. 12A in accordance with some embodiments of the present invention.
Figure 12:
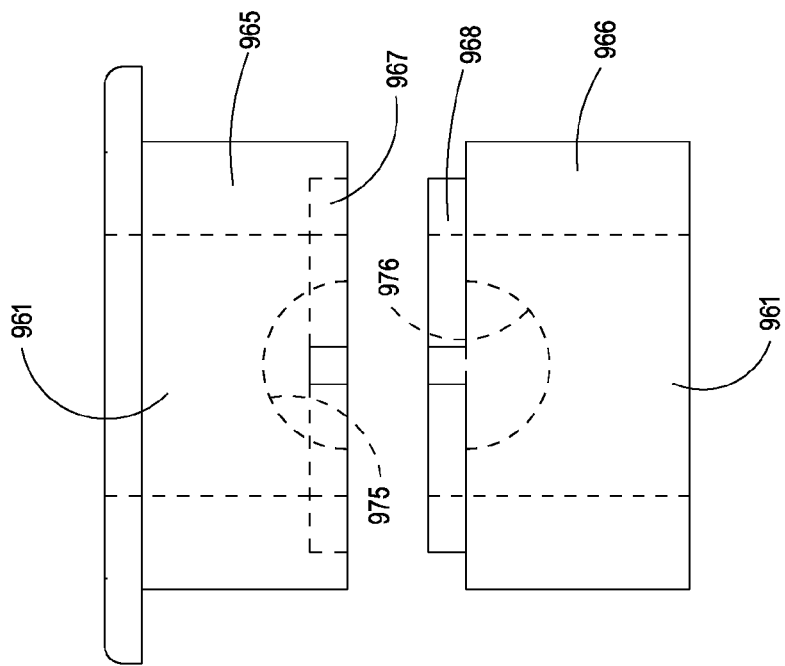

Referring particularly to the exemplary illustration of FIG. 12D, in some embodiments, collar body portion 965 and collar body portion 966 may each have an inside wall defining a collar bore 961 axially receiving a distal portion of sleeve 930. In some embodiments, sleeve 930 can include proximal end 935. In some embodiments, proximal end 935 may have a diameter that is greater than the distal portion. As discussed more fully below, the distal portion of sleeve 930 can include recess 991. However, it is to be appreciated that the sleeve may include recesses, or protrusions in accordance with some embodiments of the present invention.

In some embodiments, spring 942 can be provided between proximal end 935 of sleeve 930 and a proximal end of collar body portion 965. In some examples, as shown and without limitation, the proximal end of collar body portion 965 may be a flat surface. However, in some embodiments of the present invention, a recess or cavity may be provided on the proximal end of collar body portion 965 for receiving and stabilizing spring 942. In some embodiments, the coupling apparatus can include at least one washer. In some examples, and without limitation, washer 927 can be provided between collar body portion 966 and clip 921. It is to be appreciated that other types and locations of washers are contemplated in accordance with some embodiments of the present invention.

In some embodiments, each collar body portion may include a partial socket for receiving a ball of a hinge joint. In some embodiments, extension 970 may include hinge joint 974 permitting movement of extension 970 with respect to collar body 960. In some embodiments, hinge joint 974 can comprise a ball-and-socket hinge joint. However, it is to be appreciated that other hinge joints are contemplated in accordance with some embodiments of the present invention. Referring now particularly to the exemplary illustrations of FIGS. 12E-12G, in some embodiments, the hinge joint can include ball 973 engaged with an end of extension 970 and a socket formed by (i) partial socket 975 in collar body portion 965 and (ii) partial socket 976 in collar body portion 966. It is to be appreciated that a complete socket is formed when an inside surface of collar body portion 965 abuts collar body portion 966. In some examples, and without limitation, each of partial socket 975 and partial socket 976 are semi-hemispherical. However, it is to be appreciated that other shapes are contemplated in accordance with some embodiments of the present invention. It is also to be appreciated that the socket may be formed in one of the collar body portions and the other collar body portion may have matching features in accordance with some embodiments of the present invention.

In some embodiments, the collar body portions may have features for self aligning. For example, and without limitation, collar body portion 965 may include recess 967 for receiving protrusion 968 of collar body portion 966. In some examples, and without limitation, recess 967 and protrusion 968 may be circular and may include a tabbed portion. However, it is to be appreciated that the aligning recesses and protrusions can have other shapes in accordance with some embodiments of the present invention. It is also to be appreciated that other combinations of recesses and protrusions are contemplated in accordance with some embodiments of the present invention. For example, and without limitation, each collar body portion may include a number of aligning recesses and protrusions (such as one or more teeth).

Referring now particularly to the exemplary illustration of FIG. 12H, it can be appreciated that extension 970 can be engaged and disengaged from the collar body (for example, and without limitation, the collar body formed by collar body portion 965 and collar body portion 966). In an engaged mode, spring 942 may press a proximal end of collar body portion 965 away from proximal end 935 of the sleeve. An inside surface of collar body portion 965 may be in abutting contact with an inside surface of collar body portion 966, itself which is restrained on its opposite end by clip 921 in recess 991 of sleeve (and optionally, washer 927). To disengage extension 970 from the collar body, in some examples, and without limitation, collar body portion 965 may be drawn towards proximal end 935 of the sleeve compressing spring 942. As collar body portion 965 moves, ball 973 of extension 970 may be removed from the socket formed by partial socket 975 and partial socket 976.

Referring back to the exemplary illustration of FIG. 12B, in some embodiments, an additional lock may be provided for restraining movement of sleeve 930 with respect to linkage rod 910. For example, and without limitation, the additional lock may include split washer 918 and hex nut 919. However, it is to be appreciated that other locks are contemplated in accordance with some embodiments of the present invention. For example, and without limitation, the additional lock can include a machine washer or a lock nut.

In some embodiments, extension 970 of collar 950 may include threaded bolt 977 and a fastener for securely attaching a device (for example, and without limitation, an actuator arm) thereto. In some examples, and without limitation, the fastener can include split washer 978 and hex nut 979. However, it is to be appreciated that other fasteners are contemplated in accordance with some embodiments of the present invention.

The present invention thusly provides improved coupling apparatuses that do not suffer from the drawbacks of conventional coupling apparatuses and which enable safer, easier and more precise adjustments. It is to be understood that variations and/or modifications of the present invention may be made without departing from the scope thereof. For example, coupling apparatuses in accordance with some embodiments of the present invention may have various permutations of sleeves, collars, and/or intermediate sleeves, and recesses, protrusions, or other features, as described generally herein. It is also to be understood that the present invention is not to be limited by the specific embodiments, descriptions, or illustrations or combinations of either components or steps disclosed herein. Thus, although reference has been made to the accompanying figures, it is to be appreciated that these figures are exemplary and are not meant to limit the scope of the present invention.

What is claimed is:

1. An apparatus for adjustably coupling a threaded linkage rod to a device, said apparatus comprising:
   a. an elongate sleeve comprising an outside wall and an inside threaded wall defining a sleeve bore for axially receiving said linkage rod, wherein said sleeve bore extends through the entirety of said sleeve, said sleeve further comprising a proximal end for positioning said sleeve on said linkage rod and an elongate distal portion, wherein a diameter of an outside wall of said proximal end is greater than a diameter of an outside wall of said distal portion;
   b. a collar comprising (i) a collar body having a collar bore axially receiving through the entirety thereof said distal portion of said elongate sleeve, wherein said collar body is moveable with respect to said sleeve, and (ii) an extension for securement through an opening of said device; and
   c. a first lock on said distal portion of said sleeve restraining axial movement of said collar with respect to said sleeve.

2. The apparatus of claim 1, wherein said outside wall of said proximal end of said sleeve comprises one of the group consisting of a machined surface and a geometric surface comprising at least three lateral faces.

3. The apparatus of claim 1, said collar body further comprising at least two collar body portions, each said collar body portion having an inside wall partially defining said collar bore.

4. The apparatus of claim 3, wherein said collar body portions are coupled by one of the group consisting of a bolt, a screw, a snap-fit connection, and a clamp.

5. The apparatus of claim 1, said collar body further comprising:
   a. an inner ball with an axial opening therein defining said collar bore; and
   b. a socket receiving said inner ball.

6. The apparatus of claim 1, further comprising:
   a. an intermediate sleeve between said collar body and said elongate sleeve, said intermediate sleeve having an axial opening therein defining an intermediate sleeve bore, wherein a wall of said intermediate sleeve has a tapered circular opening therein; and b. a ball between said elongate sleeve and said circular opening in said intermediate sleeve, wherein said ball has a diameter greater than a diameter of said circular opening in said intermediate sleeve.

7. The apparatus of claim 6, said intermediate sleeve further comprising an inwardly protruding member on a distal end thereof.

8. The apparatus of claim 7, wherein said first lock comprises a recess in said outside wall of said elongate sleeve for receiving said inwardly protruding member of said intermediate sleeve, said recess comprising one of the group consisting of a well, a groove, and a slot.

9. The apparatus of claim 1, wherein said first lock comprises a recess in said outside wall of said sleeve for receiving a clip, said recess comprising one of the group consisting of a well, a groove, and a slot.

10. The apparatus of claim 1, wherein said first lock comprises a recess in said outside wall of said sleeve for receiving a protrusion on an inside wall of said collar body, said recess comprising one of the group consisting of a well, a groove, and a slot.

11. The apparatus of claim 10, wherein said protrusion comprises one of the group consisting of a spring loaded ball, a spring loaded tab, and a deformable tab.

12. The apparatus of claim 1, wherein said first lock comprises a protrusion on said outside wall of said elongate sleeve for positioning in a recess in an inside wall of said collar body, said recess comprising one of the group consisting of a well, a groove, and a slot.

13. The apparatus of claim 1, wherein said first lock comprises a member on said distal portion of said sleeve, said member comprising one of the group consisting of a rigid member, a spring loaded ball, a spring loaded tab, and a deformable tab.

14. The apparatus of claim 1, wherein said first lock comprises an enlarged distal end of said elongate sleeve for abutting a distal end of said collar body.

15. The apparatus of claim 1, wherein said extension comprises at least one hinge joint.

16. The apparatus of claim 15, wherein said hinge joint comprises a ball and a socket.

17. The apparatus of claim 1, further comprising a second lock restraining axial movement of said elongate sleeve with respect to said linkage rod.

18. A coupling apparatus for a threaded linkage rod, said coupling apparatus comprising:
 a. an elongate sleeve having a proximal end and an elongate distal portion, said distal portion of said elongate sleeve comprising an outside wall and an inside threaded wall defining a bore for axially receiving said linkage rod, wherein said sleeve bore extends through the entirety of said sleeve, and wherein a diameter of an outside wall of said proximal end is greater than a diameter of an outside wall of said distal portion;
 b. a collar having a collar body and an extension, said collar body completely circumscribing and moveable with respect to at least a portion of said distal portion of said sleeve, said extension for engaging one of the group consisting of a fuel valve, an air valve, an air damper, a damper blade assembly, and an actuator through a portion thereof;
 c. a first lock on said distal portion of said sleeve restraining axial movement of said collar body with respect to said sleeve.

19. The coupling apparatus of claim 18, wherein said outside wall of said proximal end comprises one of the group consisting of a machined surface and a geometric surface comprising at least three faces.

20. The coupling apparatus of claim 18, wherein said collar body has an inside wall defining a collar bore axially receiving said distal portion of said elongate sleeve.

21. The coupling apparatus of claim 20, wherein said extension comprises a ball-and-socket hinge joint.

22. The coupling apparatus of claim 20, wherein said first lock comprises a recess in an outside wall of said distal portion of said elongate sleeve for receiving a clip.

23. The coupling apparatus of claim 18, wherein said collar body further comprises (i) an inner ball with an opening therein defining a collar bore axially receiving said distal portion of said elongate sleeve and (ii) an inside wall defining a socket receiving said ball.

24. The coupling apparatus of claim 23, wherein said first lock comprises a recess in an outside wall of said distal portion of said elongate sleeve for receiving a clip.

25. The coupling apparatus of claim 18, wherein said collar body further comprises at least two collar body portions, each said collar body portion having an inside wall partially defining a collar bore axially receiving said distal portion of said elongate sleeve, wherein said collar body portions are coupled by one of the group consisting of a bolt, a screw, a snap ring, an e-type clip, a c-type clip, a snap-fit connection, and a clamp.

26. The coupling apparatus of claim 25, wherein said first lock comprises a recess in an outside wall of said distal portion of said elongate sleeve for receiving a protrusion on an inside wall of at least one of said collar body portions.

27. The coupling apparatus of claim 26, wherein said extension comprises a ball-and-socket hinge joint.

28. The coupling apparatus of claim 18, further comprising an intermediate sleeve between said collar body and said elongate sleeve comprising:
 a. an axial opening defining an intermediate sleeve bore receiving said distal portion of said elongate sleeve; and
 b. a wall having at least one tapered circular opening therein for receiving a ball.

29. The coupling apparatus of claim 28, wherein said collar body further comprises an inside wall defining a socket receiving said ball.

30. The coupling apparatus of claim 28, further comprising a spring between said proximal end of said elongate sleeve and a proximal end of said intermediate sleeve.

31. The coupling apparatus of claim 30, wherein said first lock comprises a recess in an outside wall of said distal portion of said elongate sleeve for receiving an inwardly protruding member on a distal end of said intermediate sleeve.

32. The coupling apparatus of claim 28, wherein said extension comprises a ball-and-socket hinge joint.

33. The coupling apparatus of claim 18, wherein said collar body further comprises at least two collar body portions, each said collar body portion having an inside wall partially defining a collar bore axially receiving said distal portion of said elongate sleeve.

34. The coupling apparatus of claim 33, wherein said extension comprises a ball-and-socket hinge joint, wherein said collar body portions define a socket of said joint.

35. The coupling apparatus of claim 34, further comprising a spring between said proximal end of said elongate sleeve and a proximal end of a first of said collar body portions.

36. The coupling apparatus of claim 35, further comprising a recess in said proximal end of said first of said collar body portions for receiving said spring.

37. The coupling apparatus of claim 33, wherein said first lock comprises at least one recess in said outside wall of said distal portion of said elongate sleeve for receiving a clip.

38. The coupling apparatus of claim 18, further comprising a second lock restraining axial movement of said elongate sleeve with respect to said linkage rod.

39. A linkage for use in a system having a fuel valve and an air damper, said linkage comprising:
 a. an elongate linkage rod, wherein at least a portion of an outside surface of said linkage rod comprises threading; and
 b. at least two coupling apparatuses, each said coupling apparatus comprising (i) an elongate sleeve comprising an outside wall and an inside wall defining a bore, said inside wall having threading complementary to said threading of said linkage rod, wherein said sleeve bore extends through the entirety of said sleeve, said sleeve further comprising a proximal end for positioning said sleeve on said linkage rod and an elongate distal portion, wherein a diameter of an outside wall of said proximal end is greater than a diameter of an outside wall of said distal portion, (ii) a collar having a collar body and an extension, said collar body completely circumscribing and moveable with respect to at least a portion of said elongate sleeve, and (iii) a first lock on said distal portion of said sleeve restraining axial movement of said collar body with respect to said sleeve,
  wherein at least one of said coupling apparatus extensions is for securement through an opening of said fuel valve and at least one of said coupling apparatus extensions is for securement through an opening of said air damper.

40. The linkage of claim 39, each said coupling apparatus further comprising a second lock restraining axial movement of said elongate sleeve with respect to said linkage rod.

41. The linkage of claim 39, wherein at least one of said coupling apparatus extensions comprises a hinge joint.

42. The linkage of claim 39, each said coupling apparatus further comprising an intermediate sleeve between said elongate sleeve and said collar.

43. A system comprising:
 a. a device consisting of one of the group consisting of a fuel valve, an air valve, an air damper, a damper blade assembly, and an actuator;
 b. an elongate linkage rod, wherein at least a portion of an outside surface of said linkage rod comprises threading;
 c. an elongate sleeve comprising an outside wall and an inside threaded wall defining a sleeve bore axially receiving said linkage rod, said sleeve comprising a proximal end having a diameter greater than a distal portion;
 d. a collar comprising (i) a collar body having a collar bore axially receiving through the entirety thereof said distal portion of said elongate sleeve, wherein said collar body is movable with respect to said sleeve, and (ii) an extension for engagement with said device through an opening therein; and
 e. a first lock on said distal portion of said sleeve restraining axial movement of said collar with respect to said sleeve.

44. The system of claim 43, further comprising a second lock restraining axial movement of said elongate sleeve with respect to said linkage rod.

* * * * *